(12) United States Patent
Brandt et al.

(10) Patent No.: US 11,978,094 B2
(45) Date of Patent: May 7, 2024

(54) PERVASIVE ADVISOR FOR MAJOR EXPENDITURES

(71) Applicant: Wells Fargo Bank, N.A., San Francisco, CA (US)

(72) Inventors: Balin K. Brandt, Brooklyn, NY (US); Laura Fisher, Rock Hill, SC (US); Marie Jeanette Floyd, Toronto (CA); Katherine J. McGee, San Francisco, CA (US); Teresa Lynn Rench, Mount Holly, NC (US); Sruthi Vangala, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/134,979

(22) Filed: Apr. 14, 2023

(65) Prior Publication Data

US 2023/0252533 A1 Aug. 10, 2023

Related U.S. Application Data

(63) Continuation of application No. 16/382,108, filed on Apr. 11, 2019, now Pat. No. 11,631,127.
(Continued)

(51) Int. Cl.
*G06Q 20/40* (2012.01)
*G06Q 20/02* (2012.01)
(Continued)

(52) U.S. Cl.
CPC ......... *G06Q 30/0279* (2013.01); *G06Q 20/02* (2013.01); *G06Q 20/0855* (2013.01);
(Continued)

(58) Field of Classification Search
CPC ............... G06Q 30/0279; G06Q 20/02; G06Q 20/0855; G06Q 20/108; G06Q 20/16;
(Continued)

(56) References Cited

U.S. PATENT DOCUMENTS

| 4,223,403 A | 9/1980 | Konheim et al. |
| 4,731,842 A | 3/1988 | Smith |

(Continued)

FOREIGN PATENT DOCUMENTS

| AU | 2015201432 A1 | 4/2015 |
| WO | WO-01/69830 A2 | 9/2001 |

(Continued)

OTHER PUBLICATIONS

Zhao, H. and Malik, H., 2013. Audio recording location identification using acoustic environment signature. IEEE Transactions on Information Forensics and Security, 8(11), pp. 1746-1759. (Year: 2013).*

(Continued)

*Primary Examiner* — Eric T Wong
*Assistant Examiner* — John O Preston
(74) *Attorney, Agent, or Firm* — Foley & Lardner LLP

(57) ABSTRACT

A pervasive advisor for major purchases and other expenditures may detect that a customer is contemplating a major purchase (e.g., through active listening). The advisor may assist the customer with the timing and manner of making the purchase in a way that is financially sensible in view of the customer's financial situation. A customer may be provided with dynamically-updated information in response to recent actions that may affect an approved loan amount and/or interest rate. Underwriting of a loan may be triggered based on the geo-location of the user. Financial advice may be provided to customers to help them meet their goals using information obtained from third party sources, such as
(Continued)

purchase options based on particular goals. The pervasive advisor may thus intervene to assist with budgeting, financing, and timing of major expenditures based on the customer's location and on the customer's unique and changing circumstances.

19 Claims, 19 Drawing Sheets

Related U.S. Application Data

(60) Provisional application No. 62/666,587, filed on May 3, 2018, provisional application No. 62/666,591, filed on May 3, 2018, provisional application No. 62/656,753, filed on Apr. 12, 2018, provisional application No. 62/656,750, filed on Apr. 12, 2018.

(51) Int. Cl.
*G06Q 20/08* (2012.01)
*G06Q 20/10* (2012.01)
*G06Q 20/16* (2012.01)
*G06Q 20/22* (2012.01)
*G06Q 20/32* (2012.01)
*G06Q 20/36* (2012.01)
*G06Q 30/0279* (2023.01)
*G06Q 40/03* (2023.01)
*G06Q 50/00* (2012.01)
*G10L 15/18* (2013.01)
*G10L 15/22* (2006.01)
*G10L 17/00* (2013.01)
*H04L 9/40* (2022.01)
*H04M 3/51* (2006.01)
*H04W 4/029* (2018.01)
*H04W 4/38* (2018.01)

(52) U.S. Cl.
CPC ........... *G06Q 20/108* (2013.01); *G06Q 20/16* (2013.01); *G06Q 20/227* (2013.01); *G06Q 20/3224* (2013.01); *G06Q 20/3676* (2013.01); *G06Q 20/4014* (2013.01); *G06Q 40/03* (2023.01); *G06Q 50/01* (2013.01); *G10L 15/1807* (2013.01); *G10L 15/22* (2013.01); *G10L 17/00* (2013.01); *H04L 63/102* (2013.01); *H04L 63/104* (2013.01); *H04M 3/5183* (2013.01); *H04W 4/029* (2018.02); *H04W 4/38* (2018.02); *G10L 2015/228* (2013.01); *H04L 2209/56* (2013.01)

(58) Field of Classification Search
CPC ............ G06Q 20/227; G06Q 20/3224; G06Q 20/3676; G06Q 20/4014; G06Q 40/03
USPC .......................................................... 705/38
See application file for complete search history.

(56) References Cited

U.S. PATENT DOCUMENTS

| | | | |
|---|---|---|---|
| 4,933,971 A | 6/1990 | Bestock et al. | |
| 5,577,121 A | 11/1996 | Davis et al. | |
| 6,466,654 B1 | 10/2002 | Cooper et al. | |
| 7,096,494 B1 | 8/2006 | Chen | |
| 7,315,837 B2 | 1/2008 | Sloan et al. | |
| 7,343,335 B1 | 3/2008 | Olliphant | |
| 7,818,233 B1 | 10/2010 | Sloan et al. | |
| 8,660,849 B2 | 2/2014 | Gruber et al. | |
| 8,880,402 B2 | 11/2014 | Wasson et al. | |
| 8,998,096 B2 | 4/2015 | Brown | |
| 9,098,845 B2 | 8/2015 | Florek et al. | |
| 9,117,208 B2 | 8/2015 | Drury et al. | |
| 9,123,038 B2 | 9/2015 | Cozens et al. | |
| 9,213,855 B1 | 12/2015 | Corrales et al. | |
| 9,218,594 B2 | 12/2015 | Ramakrishna et al. | |
| 9,224,113 B2 | 12/2015 | Grigg et al. | |
| 9,318,108 B2 | 4/2016 | Gruber et al. | |
| 9,477,945 B2 | 10/2016 | Wu et al. | |
| 9,495,331 B2 | 11/2016 | Govrin et al. | |
| 9,519,932 B2 | 12/2016 | Calman et al. | |
| 9,548,050 B2 | 1/2017 | Gruber et al. | |
| 9,973,689 B2 | 5/2018 | De Bayser et al. | |
| 10,027,797 B1 | 7/2018 | Hodge et al. | |
| 10,162,896 B1 | 12/2018 | Sumter et al. | |
| 10,276,170 B2 | 4/2019 | Gruber et al. | |
| 10,291,560 B2 | 5/2019 | Bern et al. | |
| 10,332,047 B2 | 6/2019 | Wu et al. | |
| 10,510,107 B1 | 12/2019 | Lee et al. | |
| 10,573,146 B1 | 2/2020 | Jordan et al. | |
| 10,916,251 B1 | 2/2021 | Brandt et al. | |
| 10,943,308 B1 | 3/2021 | Brandt et al. | |
| 10,951,762 B1 | 3/2021 | Brandt et al. | |
| 11,521,245 B1 | 12/2022 | Brandt et al. | |
| 11,551,696 B1 | 1/2023 | Brandt et al. | |
| 11,631,127 B1 | 4/2023 | Brandt et al. | |
| 2005/0097033 A1 | 5/2005 | Pretell et al. | |
| 2005/0156026 A1 | 7/2005 | Ghosh et al. | |
| 2006/0074788 A1 | 4/2006 | Grizack et al. | |
| 2008/0103781 A1 | 5/2008 | Wasson et al. | |
| 2009/0103730 A1 | 4/2009 | Ward et al. | |
| 2009/0119190 A1 | 5/2009 | Realini | |
| 2010/0106498 A1* | 4/2010 | Morrison | G10L 15/02 704/235 |
| 2010/0131413 A1 | 5/2010 | Kranzley et al. | |
| 2010/0169789 A1 | 7/2010 | Cheng et al. | |
| 2010/0250421 A1 | 9/2010 | Ariff et al. | |
| 2010/0318576 A1 | 12/2010 | Kim | |
| 2012/0150728 A1 | 6/2012 | Isaacson et al. | |
| 2012/0173464 A1 | 7/2012 | Tur et al. | |
| 2012/0185397 A1 | 7/2012 | Levovitz | |
| 2012/0197794 A1 | 8/2012 | Grigg et al. | |
| 2012/0227094 A1 | 9/2012 | Begen et al. | |
| 2012/0316916 A1 | 12/2012 | Andrews et al. | |
| 2013/0030994 A1 | 1/2013 | Calman et al. | |
| 2013/0054474 A1 | 2/2013 | Yeager | |
| 2013/0085931 A1 | 4/2013 | Runyan | |
| 2013/0091212 A1 | 4/2013 | Rajakarunanayake | |
| 2013/0091582 A1 | 4/2013 | Chen et al. | |
| 2013/0159173 A1 | 6/2013 | Sivaraman et al. | |
| 2013/0167196 A1 | 6/2013 | Spencer et al. | |
| 2013/0262290 A1 | 10/2013 | Hanson | |
| 2013/0262294 A1 | 10/2013 | Green et al. | |
| 2013/0262317 A1 | 10/2013 | Collinge et al. | |
| 2013/0339114 A1 | 12/2013 | Plut | |
| 2013/0339234 A1 | 12/2013 | Prakash et al. | |
| 2014/0040129 A1 | 2/2014 | Akin | |
| 2014/0114735 A1 | 4/2014 | Isaacson et al. | |
| 2014/0122592 A1 | 5/2014 | Houston et al. | |
| 2014/0136365 A1 | 5/2014 | Nista | |
| 2014/0156328 A1 | 6/2014 | Grigg et al. | |
| 2014/0244476 A1 | 8/2014 | Shvarts et al. | |
| 2014/0278676 A1 | 9/2014 | Burka | |
| 2014/0331278 A1 | 11/2014 | Tkachev | |
| 2014/0351118 A1 | 11/2014 | Zhao | |
| 2014/0351130 A1 | 11/2014 | Cheek et al. | |
| 2014/0351328 A1 | 11/2014 | Woods et al. | |
| 2014/0365332 A1 | 12/2014 | Sutton et al. | |
| 2015/0019229 A1 | 1/2015 | Fish | |
| 2015/0073952 A1 | 3/2015 | Ventura et al. | |
| 2015/0073959 A1 | 3/2015 | Connors et al. | |
| 2015/0100482 A1 | 4/2015 | Zamer et al. | |
| 2015/0120345 A1 | 4/2015 | Rose | |
| 2015/0189085 A1 | 7/2015 | Riahi et al. | |
| 2015/0206135 A1 | 7/2015 | Scipioni et al. | |
| 2015/0227941 A1 | 8/2015 | Tuchman et al. | |
| 2015/0242911 A1 | 8/2015 | Zises | |
| 2015/0331666 A1 | 11/2015 | Bucsa et al. | |
| 2016/0008622 A1 | 1/2016 | Mohamed et al. | |
| 2016/0012465 A1 | 1/2016 | Sharp | |
| 2016/0019472 A1 | 1/2016 | Javit | |

(56) References Cited

U.S. PATENT DOCUMENTS

| | | | |
|---|---|---|---|
| 2016/0035353 A1 | 2/2016 | Chen et al. | |
| 2016/0086222 A1* | 3/2016 | Kurapati | G06Q 40/08 705/14.53 |
| 2016/0117651 A1 | 4/2016 | Davis | |
| 2016/0125470 A1 | 5/2016 | Myers | |
| 2016/0180465 A1 | 6/2016 | Deperro et al. | |
| 2016/0197993 A1 | 7/2016 | Perkowski et al. | |
| 2016/0232546 A1 | 8/2016 | Ranft et al. | |
| 2016/0232719 A1 | 8/2016 | Brinig et al. | |
| 2016/0253702 A1 | 9/2016 | Gonzales, Jr. | |
| 2016/0253710 A1 | 9/2016 | Publicover et al. | |
| 2016/0321582 A1 | 11/2016 | Broudou et al. | |
| 2016/0360382 A1 | 12/2016 | Gross et al. | |
| 2017/0040018 A1 | 2/2017 | Tormey | |
| 2017/0150337 A1 | 5/2017 | Bareket et al. | |
| 2017/0323345 A1* | 11/2017 | Flowers | H04W 4/02 |
| 2017/0372429 A1 | 12/2017 | La Placa | |
| 2018/0077138 A1 | 3/2018 | Bansal et al. | |
| 2018/0101881 A1 | 4/2018 | Tian et al. | |
| 2018/0182383 A1 | 6/2018 | Kim et al. | |
| 2018/0191695 A1 | 7/2018 | Lindemann | |
| 2018/0376002 A1 | 12/2018 | Abraham | |
| 2019/0199715 A1 | 6/2019 | May | |
| 2019/0304576 A1 | 10/2019 | Mendoza | |
| 2019/0311791 A1 | 10/2019 | St. Paul | |
| 2020/0007530 A1 | 1/2020 | Mohamad Abdul et al. | |

FOREIGN PATENT DOCUMENTS

| | | |
|---|---|---|
| WO | WO-2012/136986 A1 | 10/2012 |
| WO | WO-2012/136987 A1 | 10/2012 |

OTHER PUBLICATIONS

Teixeira, T., Dublon, G. and Savvides, A., 2010. A survey of human-sensing: Methods for detecting presence, count, location, track, and identity. ACM Computing Surveys, 5(1), pp. 59-69. (Year: 2010).*

Markowitz, J.A., 2000. Voice biometrics. Communications of the ACM, 43(9), pp. 66-73. (Year: 2000).*

"Internet Portals Explained." Jul. 10, 2013. http://istarthere.com/internet-portals-explai ned/. (Year: 2013).

A. A. Handzel and P. S. Krishnaprasad, "Biomimetic sound-source localization," in IEEE Sensors Journal, vol. 2, No. 6, pp. 607-616, Dec. 2002, doi: 10.1109/JSEN .2002.807772. (Year: 2002).

Agadakos, et al., "Location-enhanced Authentication using the IOT," in ACSAC, 2016 (Year: 2016).

Azizyan, M., Constandache, I., & Roy Choudhury, R. (2009, September). Surroundsense: mobile phone localization via ambience fingerprinting. In Proceedings of the 15th annual international conference on Mobile computing and networking (pp. 261-272). (Year: 2009).

Bedra et al., "Design Best Practices for an Authentication System," IEEE Cyber Security. Jun. 2, 2016 (Year: 2016).

DC Software Arts, "Trip Splitter—Track shared expenses and easily even up", http://www.dcsoftwarearts.com/tripsplitter, Apr. 7, 2017; 4 pages.

Lon et al., "Don't Trust POS Terminals! Verify in-shop payments with your phone", 2010, 10 pages.

Lopez et al., "Advice goes virtual: how new digital investment services are changing the wealth management landscape", Journal of Financial Perspectives 3.3, 2015, 1-21.

Maximo Cobos, Fabio Antonacci, Anastasios Alexandridis, Athanasios Mouchtaris, Bowan Lee, "A Survey of Sound Source Localization Methods in Wireless Acoustic Sensor Networks", Wireless Communications and Mobile Computing, vol. 2017, Article ID 3956282, 24 pages, 2017. (Year: 2017).

Sushma et.al, in "A Group Policy Based Authentication for Cloud Sharing," International Journal of Innovative Science, Engineering and Technology, vol. 3, Issue 8. (Year: 2016).

* cited by examiner

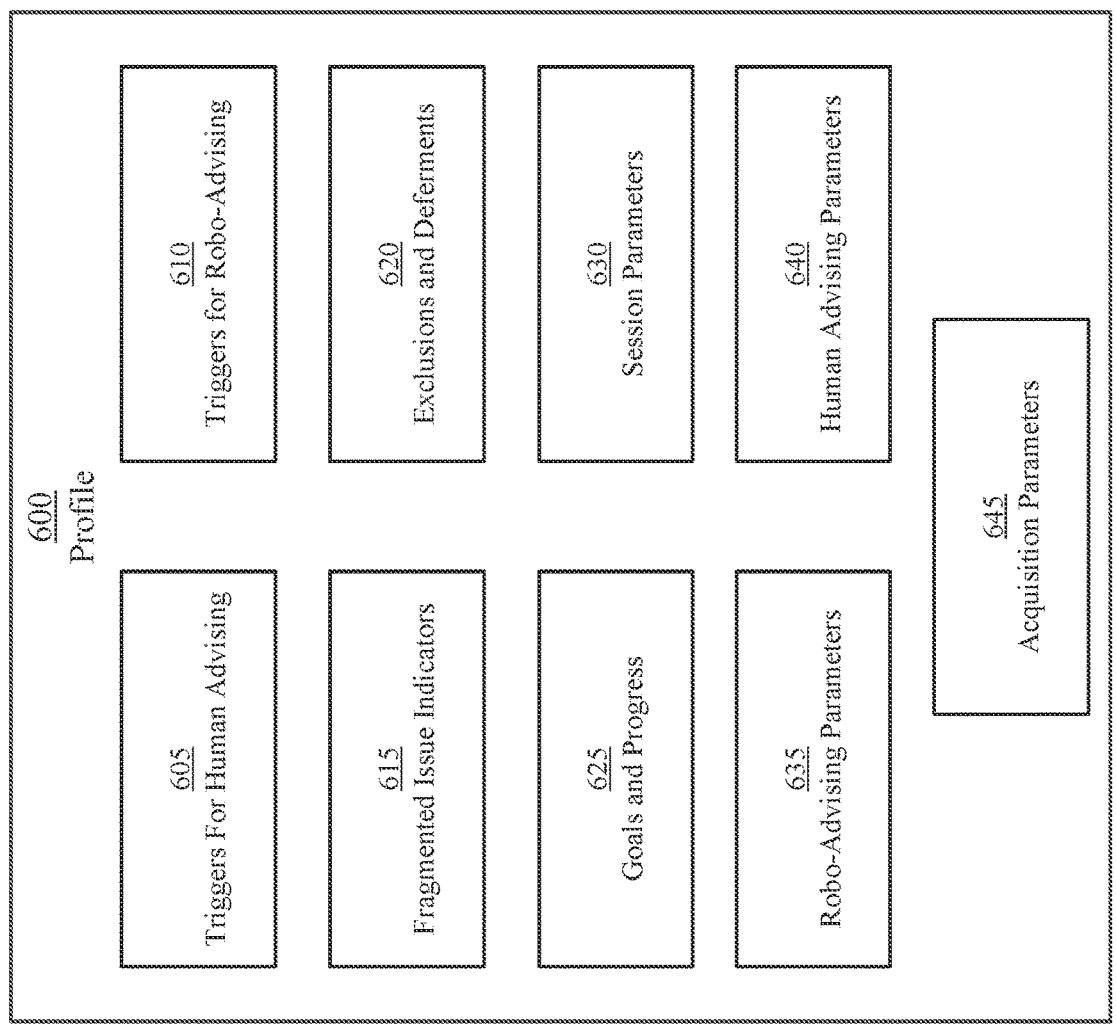

MAJOR EXPENDITURE GOALS OVERVIEW

| Goal | Affordability | Recommendation | Options | Source | Cost |
|---|---|---|---|---|---|
| Travel Europe | Now: $8,000 at 15% | Keep saving! Travel next winter because of forecast for lower fuel / flight costs. | Flight 1 | Travel Site 1 | $800 |
| | | | Flight 2 | Travel Site 2 | $620 |
| | Then: $9,500 at 12% | | Lodging 1 | Travel Site 2 | $400 |
| | | | Lodging 2 | Travel Site 3 | $525 |
| | | | ... | ... | ... |
| New Car | Now: $24,000 at 8% | Buy in 6 months because rising car inventories might mean lower prices for cars | Car 1 | Dealer 1 | $10,400 |
| | Then: $28,000 at 7% | | Car 2 | Dealer 2 | $12,100 |
| | | | ... | ... | ... |
| Engagement Ring | Now: $2,000 at 12% | Buy now because of dip in price of precious metals. | Ring 1 | Merchant 1 | $380 |
| | Then: $2,350 at 11% | | Ring 2 | Merchant 2 | $950 |
| | | | ... | ... | ... |
| New Home | Now: $225,000 at 6.5% | Buy in a year based on anticipated rise in value of current home, anticipated savings, and forecast for interest rates. | Home 1 | Realtor 1 | $220,000 |
| | Then: $245,000 at 6% | | Home 2 | Realtor 2 | $235,000 |
| | | | ... | ... | ... |

FIG. 7

Today's Summary
GOALS
Goal 1: Buy New Car
Target Date: November 2018 (11 months)
Estimated Purchase Value: $28,800
Estimated Monthly Payment: $539
Goal 2: College Fund
Target Date: August 2028 (10 years 8 months)
Estimated Purchase Value: $40,000
ACCOUNTS
Acct 1: Checking
Balance: $5,600
Acct 2: Savings
Balance: $3,500
Acct 3: Credit Card
Balance / Limit: $2,450 / $15,000
Team
Family
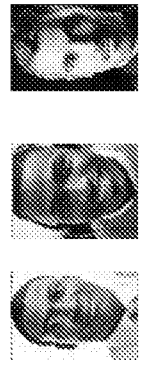
FIG. 8

PERVASIVE ADVISOR FOR MAJOR EXPENDITURES

CROSS REFERENCE TO RELATED APPLICATIONS

This application is a continuation of U.S. patent application Ser. No. 16/382,108 filed Apr. 11, 2019, which claims priority to U.S. Provisional Patent Application No. 62/666,591 filed May 3, 2018, U.S. Provisional Patent Application No. 62/666,587 filed May 3, 2018, U.S. Provisional Patent Application No. 62/656,750 filed Apr. 12, 2018, and U.S. Provisional Patent Application No. 62/656,753 filed Apr. 12, 2018, each of which is incorporated herein by reference in its entirety.

TECHNICAL FIELD

The present disclosure relates to systems, devices, and methods for providing situationally-aware, pervasive advising for achieving financial goals, such as major expenditures and loan underwriting therefor.

BACKGROUND

People are often unintentional about how they spend money. Without necessarily realizing it, many people tend to spend more than they can afford. The financial health of a person is correlated to the financial decisions that person makes. When it comes to making a major expenditure, most people tend to determine how to obtain funds to pay for the expenditure on their own without the assistance of a financial advisor. For example, when a person wishes to buy a house or car, he or she may receive information from a financial institution as to how much of a loan the person qualifies for and at what interest rate. However, the person may not receive advice as to whether it is the right time for the person to buy a car or home, or how much to spend on the car or home based on his or her unique circumstances (even if the person qualifies for a larger loan).

Moreover, customers want to be assured that they are purchasing what they want, and they often spend a substantial amount of time making a decision about major expenditures (e.g., time spent researching and test driving cars, searching for available homes and visiting open houses, etc.). Having spent that time on the decision of what to buy, the customer may not wish or be able to devote more time and energy on the major expenditure. Customers thus often spend much more time on deciding on which item to buy (e.g., which car, house, or jewelry) than on how best to acquire the item from a financial standpoint. For example, a person may spend time determining which car he or she would like to purchase, then go to a dealership with little to no information on how much money to borrow and at what interest rate. While at a location where a person can make a major purchase, the person typically has to obtain funds to finance the purchase after he or she has discussed a particular item or property. The customer may, for example, go to a dealership and rely on the dealer to arrange for financing (e.g., by contacting financial institutions on behalf of the customer and helping with the loan application process). Such systems and models are not only reactive, slow, and cumbersome, they also leave such persons susceptible to making major expenditures without a budget or financial plan, and potentially spending more than they can afford.

What are needed are systems and methods that address one or more of the above, as well as other, shortcomings of conventional approaches.

SUMMARY

Example systems and methods relate to providing a pervasive advisor structured to generate an expense strategy. One or more user computing devices may detect a voice input indicative of a financial goal (such as a major purchase). An expense strategy structured to meet the financial goal may be provided in response to the detection of the voice input. The expense strategy may be provided to a customer associated with the user computing device. In some implementations, underwriting may occur in response to detection of particular locations of computing devices. Underwriting may be based on internal data so that credit scores with credit agencies need not be impacted.

Various embodiments of the disclosure relate to a service provider computing system. The service provider computing system may be configured to provide a pervasive advisor structured to generate an expense strategy for an expenditure. The system may comprise a database with a user profile corresponding to a user. The system may also comprise a network interface configured to communicatively couple the service provider computing system with a mobile device. The mobile device may have a sound sensor. The mobile device may also have one or more user interfaces. The mobile device may be configured to use the sound sensor to detect ambient sounds. The mobile device may also be configured to use the one or more user interfaces to perceptibly present information to the user. At least one of the mobile device and the service provider computing system may be configured to extract one or more voice inputs of the user from a subset of the ambient sounds detected using the sound sensor of the mobile device. At least one of the mobile device and the service provider computing system may also be configured to identify an expenditure based at least in part on an analysis of the one or more voice inputs. At least one of the mobile device and the service provider computing system may moreover be configured to formulate an expense strategy for the expenditure based at least in part on the expenditure and the user profile. At least one of the mobile device and the service provider computing system may additionally be configured to present the expense strategy to the user via the one or more user interfaces of the mobile device.

In one or more implementations, formulating the expense strategy may comprise generating a loan to be used for the expenditure. Presenting the expense strategy may comprise presenting the loan as an option for paying for the expenditure.

In one or more implementations, the voice input may be identified in the subset of ambient sounds using a biometric voice signature of the user.

In one or more implementations, analysis of the one or more voice inputs may comprise identifying a plurality of fragmented issue indicators. The expenditure may be identified based at least in part on a combination of fragmented issue indicators.

In one or more implementations, the plurality of fragmented issue indicators are phrases spoken by the user on different days.

In one or more implementations, at least one of the mobile device and the service provider computing system may be configured to determine a physical location of the mobile device. The physical location may be determined based on a mobile wallet transaction executed via a mobile wallet application running on the mobile device.

In one or more implementations, the mobile device may further comprise a location sensor. At least one of the mobile device and the service provider computing system may be configured to determine a physical location of the mobile device using the location sensor.

In one or more implementations, at least one of the mobile device and the service provider computing system may be configured to present the expense strategy when the physical location is a predetermined physical location.

In one or more implementations, at least one of the mobile device and the service provider computing system may be configured to continue to present the expense strategy only while the user remains within a predetermined radius of the physical location.

In one or more implementations, at least one of the mobile device and the service provider computing system may be configured to formulate the expense strategy based at least in part on the physical location of the mobile device.

In one or more implementations, at least one of the mobile device and the service provider computing system may be configured to identify the expenditure based at least in part on the physical location of the mobile device.

In one or more implementations, at least one of the mobile device and the service provider computing system is configured to identify the expenditure based at least in part on proximity of the mobile device to a merchant at the physical location.

In one or more implementations, the mobile device may be a first mobile device. At least one of the first mobile device and the service provider computing system may be communicatively coupled to a second mobile device. The second mobile device may comprise a location sensor configured to determine a physical location of the second mobile device. At least one of the service provider computing system, the first mobile device, and the second mobile device may be configured to identify the expenditure based at least in part on the physical location of the second mobile device determined using the location sensor of the second mobile device.

In one or more implementations, the first mobile device may be a smart speaker, and the second mobile device may be a smartphone.

In one or more implementations, the expense strategy includes a loan underwritten via the service provider computing system. Presenting the expense strategy may comprise presenting the loan as an option for paying for the expenditure. At least one of the service provider computing system and the mobile device may be configured to present the expense strategy in real-time or near real-time. The expense strategy may be presented such that initially-presented loan data may be updated based on subsequent transactions. The subsequent transactions may be detected by at least one of the mobile device and the service provider computing system.

Various embodiments of the disclosure relate to a computing device. The computing device may be configured to provide a pervasive advisor. The computing device may comprise a network interface configured to communicate with a service provider computing system via a telecommunications network. The computing device may also comprise a sound sensor configured to detect ambient sounds. The computing device may moreover comprise one or more user interfaces for presenting data. The computing device may additionally comprise a processor and memory having instructions that, when executed by the processor, cause the processor to perform specific functions. The computing device may be configured to detect one or more sound samples using the sound sensor. The computing device may also be configured to extract one or more voice inputs of a user from a subset of the one or more sounds samples. The computing device may moreover may configured to identify an expenditure based at least in part on the one or more voice inputs. The computing device may additionally be configured to receive loan data from the service provider computing system. The loan data may be for a loan generated for the expenditure. The loan may be generated by the service provider computing system based at least in part on the expenditure and/or a user profile. The computing device may further be configured to present the loan to the user via the one or more user interfaces.

In one or more implementations, extracting the one or more voice inputs may comprise identifying one or more phrases spoken by the user. The expenditure may be identified based at least in part on the spoken phrases.

In one or more implementations, the subset of sound samples may be identified based on a biometric voice signature of the user.

In one or more implementations, the computing device may comprise a location sensor. The computing device may be configured to detect a physical location of the computing device. The computing may also be configured to present the loan when the physical location is a predetermined physical location.

Various embodiments of the disclosure relate to a method. The method may be for providing a pervasive advisor. The method may comprise detecting ambient sounds using a sound sensor of a computing device. The method may also comprise extracting one or more voice inputs of a user from a subset of the ambient sounds detected using the sound sensor. The method may moreover comprise identifying an expenditure based at least in part on the one or more voice inputs. The method may moreover comprise formulating an expense strategy for the expenditure. The expense strategy may be formulated based at least in part on the expenditure and a user profile. The expense strategy may include a loan for the expenditure. The method may additionally comprise presenting the expense strategy to the user. The expense strategy may be presented via one or more user interfaces of the computing device.

In one or more implementations, the one or more voice inputs may be identified using a biometric voice signature of the user.

In one or more implementations, the method may comprise determining a physical location of the computing device using a location sensor of the computing device. The method may also comprise basing identification of the expenditure on the physical location. The method may moreover comprise basing formulation of the expense strategy on the physical location. The method may additionally comprise basing presentation of the expense strategy on the physical location.

Various embodiments of the disclosure relate to a method. The method may comprise detecting a physical location of a mobile device of a user. The physical location of the mobile device may be detected based at least in part on an activity of the mobile device. The method may also comprise determining that the physical location corresponds with a source of goods or services. The method may moreover comprise generating a loan for the goods or services. The method may additionally comprise presenting the loan to the user via one or more user interfaces of the mobile device as an option for paying for the goods and services.

In one or more implementations, the activity may be a sensor reading of a location sensor of the mobile device.

In one or more implementations, the activity may be a transaction executed via a mobile wallet application running on the mobile device.

In one or more implementations, determining that the physical location corresponds with a source of goods or services may comprise cross-referencing the physical location with merchant data in a database.

In one or more implementations, the database may be a third-party database accessed via a telecommunications network.

In one or more implementations, the method may comprise determining the goods or services are goods or services desired or needed by the user.

In one or more implementations, the loan may be not presented to the user unless the goods or services are determined to be goods or services desired or needed by the user.

In one or more implementations, the mobile device may be a first computing device. The goods or services may be determined to be goods or services desired or needed by the user based at least in part on a sound sample detected using a sound sensor. The sound sensor may be a sound sensor of at least one of the first computing device and a second computing device.

In one or more implementations, the first computing device may be a smartphone. The second computing device may be a smart speaker.

In one or more implementations, determining the goods or services as goods or services desired or needed by the user may comprise analyzing the sound sample to identify a biometric voice signature of the user.

In one or more implementations, the sound sample may be a first sound sample detected using the first computing device. Determining the goods or services as goods or services desired or needed by the user may comprise detecting a second sound sample using the second computing device. The goods or services may be determined to be goods or services desired or needed by the user based on both the first and second sound samples.

In one or more implementations, determining the goods or services as goods or services desired or needed by the user may comprise analyzing the first sound sample to identify a first phrase spoken by the user. Determining the goods or services as goods or services desired or needed by the user may also comprise analyzing the second sound sample to identify a second phrase spoken by the user. Determining the goods or services as goods or services desired or needed by the user may moreover comprise determining that the combination of the first and second phrases indicates that the goods or services are goods or services desired or needed by the user.

In one or more implementations, the first and second sound samples may not overlap in time.

In one or more implementations, the first and second sound samples may be detected on different days.

In one or more implementations, the first and second computing devices may not be co-located.

In one or more implementations, determining the goods or services as goods or services desired or needed by the user may comprise detecting a first sound sample and analyzing the first sound sample to identify a first issue fragmented issue indicator. Determining the goods or services as goods or services desired or needed by the user may also comprise detecting a second sound sample and analyzing the second sound sample to identify a second fragmented issue indicator. The second sound sample may be non-overlapping in time with the first sound sample. Determining the goods or services as goods or services desired or needed by the user may moreover comprise determining that the first and second fragmented issue indicators together indicate that the user desires or needs the goods or services.

In one or more implementations, the first fragmented issue indicator and the second fragmented issue indicators may be phrases spoken by the first user and a second user, respectively.

In one or more implementations, determining the goods or services as goods or services desired or needed by the user may comprise identifying a first biometric voice signature of the first user in the first sound sample. Determining the goods or services as goods or services desired or needed by the user may also comprise identifying a second biometric voice signature of the second user in the second sound sample. Determining the goods or services as goods or services desired or needed by the user may moreover comprise determining that the first and second users are related. Determining the goods or services as goods or services desired or needed by the user may additionally comprise determining that the first and second issue indicators are related.

Various embodiments of the disclosure relate to a mobile device. The mobile may comprise a sound sensor configured to detect ambient sounds. The mobile device may also comprise a location sensor configured to detect a physical location of the mobile device. The mobile device may moreover comprise a network interface configured to communicate via a telecommunications network. The mobile device may additionally comprise one or more user interfaces configured to present perceptible elements. The mobile device may further comprise a processor and memory having instructions that, when executed by the processor, cause the processor to perform specific functions. The mobile device may be configured to detect a physical location of the mobile device based on at least one of a physical location detected by the location sensor and ambient sounds detected using the sound sensor. The mobile device may also be configured to determine that the physical location corresponds with a source of goods or services. The mobile device may moreover may configured to receive, from a service provider computing system, loan data for a loan for purchasing the goods or services. The mobile device may additionally be configured to present perceptible elements using the one or more user interfaces to present the loan as an option for paying for the goods and services.

In one or more implementations, the instructions may cause the processor to detect a sound sample using the sound sensor. The instructions may also cause the processor to determine that the goods or services are goods or services desired or needed by the user based at least in part on the sound sample.

Various embodiments of the disclosure relate to a service provider computing system. The service provider computing system may comprise a network interface configured to communicate via a telecommunications network. The service provider computing system may also comprise a processor and memory having instructions that, when executed by the processor, cause the processor to perform specific functions. The service provider computing system may be configured to determine a physical location of a mobile device based at least in part on a detected activity. The detected activity may comprise detection of the physical location of the mobile device using a location sensor of the mobile device. The detected activity may alternatively or additionally comprise detection of a mobile wallet transaction executed via an application running on the mobile device and identification of the physical location of at least one of the entities engaging in the mobile wallet transaction. The detected activity may alternatively or additionally comprise detection of ambient sounds using a sound sensor of the mobile device and analysis of the ambient sounds to identify a sound signature indicative of a physical location. The service provider computing system may also be configured to generate a loan based at least in part on the physical location of the mobile device. The service provider computing system may moreover be configured to transmit loan data corresponding with the loan to the mobile device for perceptible presentation via one or more user interfaces of the mobile device to indicate the loan as an option for paying for the goods and services.

In one or more implementations, generating the loan may comprise identifying goods or services that may be acquired at the physical location. The loan may be generated for paying for the goods or services.

In one or more implementations, the instructions may cause the processor to determine that a user associated with the mobile device desires or needs the goods or services.

In one or more implementations, the user may be determined to desire or need the goods or services. The user may be determined to desire or need the goods or services based at least in part on a voice input. The voice input may be detected using the sound sensor of the mobile device.

These and other features, together with the organization and manner of operation thereof, will become apparent from the following detailed description when taken in conjunction with the accompanying drawings.

BRIEF DESCRIPTION OF THE FIGURES

FIG. 6 depicts an example profile applicable to advising of one or more users according to example embodiments.

FIG. 7 depicts an example data structure for the major expenditure goals of a customer according to example embodiments.

FIG. 8 depicts an example graphical user interface of a potential virtual dashboard according to example embodiments.

DETAILED DESCRIPTION

Figure 1:
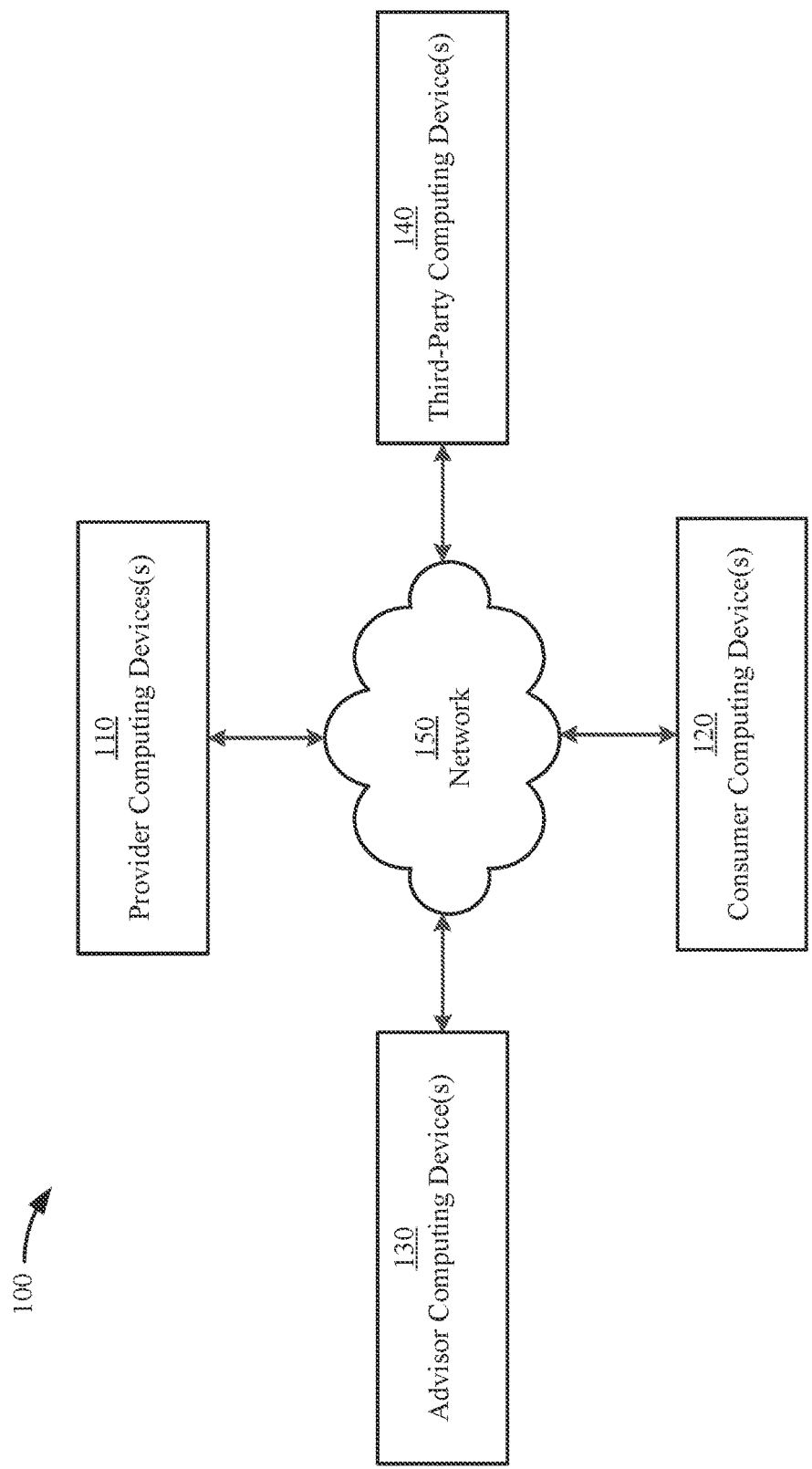
FIG. 1 is a block diagram of an example computing system framework for major expenditure advising according to example embodiments.

Disclosed are example systems and methods for providing a pervasive advisor for major purchases and other expenditures that generally require or otherwise benefit from thoughtful budgeting and planning. In various versions, a pervasive advisor may detect that a customer is contemplating a major purchase (e.g., through active listening and analyses of conversations). The advisor may assist the customer with the timing and manner of making the purchase in a way that is financially sensible in view of the customer's financial situation. In some implementations, a customer may be provided with dynamically-updated information (in response to, e.g., recent actions that may affect the customer's credit score) about an approved loan amount (where the loan relates to a specific financial goal of the customer, such as buying a new car). The customer may be informed, for example, "Because you just took action X [to improve your credit score], the interest rate you would pay is now lower, and for the same total loan cost, you can now afford to spend $Y more towards your financial goal [buying a new car]."

In various implementations, underwriting of a loan may be triggered based on the geo-location of the user (e.g., when the customer is at a new car dealership, at a house that is for sale, at a jewelry dealer, etc.). Financial advice may be provided to customers to help them meet their goals using information obtained from third party sources (via, e.g., application programming interfaces (APIs) of the third parties). This may include purchase options (e.g., cars available at other dealers) for a customer who has a particular goal (e.g., purchasing a new car).

The disclosed approach may include a pervasive advisor capable of intervening to assist with the budgeting and financing of major expenditures and with helping the customer to spend what the customer can afford, and at the right time, based on the customer's location and on the customer's unique and changing circumstances. In some implementations, the pervasive advisor may be structured to generate an expense strategy. As used herein, the term "expense strategy" may be used to refer to a strategy generated to meet a financial goal. An expense strategy may include a financial plan, budget, investment strategy, or combination thereof. Example systems may include a consumer computing device (e.g., a voice activated digital assistant) for receiving user inputs (e.g., conversations) and for presenting financial information via one or more user interfaces. The pervasive advisor may, in certain implementations, provide automated ("robo") advising using one or more artificial intelligence and machine learning tools ("AI") executed on one or more computing devices.

The consumer computing device may be in communication with a provider computing device of a provider that may be a financial institution. The consumer computing device may be structured to detect a voice input indicative of a financial goal (e.g., a major expenditure, credit issues, transaction, or purchase such as a vacation, new home, expensive jewelry purchase, or any other purchase requiring a substantial or significant amount of funds) and receive, via the consumer computing device, an expense strategy structured to meet the financial goal in response to the detection of the voice input. In some implementations, the expense strategy, or aspects thereof, may be generated by the provider computing device, the customer computing device, or a combination thereof. The consumer computing device may be structured to present the expense strategy to a customer associated with the consumer computing device. In certain implementations, an advisor may be consulted via an advising session between one or more consumer computing devices and one or more advisor computing devices.

In an illustrative example, using inputs acquired using one or more provider computing devices, consumer computing devices, and/or advisor computing devices, it may be determined that a customer is contemplating buying a new car. The fact that the customer is contemplating buying a new car may be learned by applying AI (implemented, e.g., via the provider computing device and/or the customer computing device) to, for example, one or more conversations and discussions of the customer. The input may be acquired, for example, through active listening by a smart speaker or other consumer computing device having a microphone, by an advisor who is assisting with financial planning via the advisor computing device, or in another manner.

Through location mechanisms (e.g., GPS devices), the provider computing device and/or consumer computing device may detect that the consumer computing device is, for example, at a new car dealership. Potentially, it may have been several months or more since the consumer computing device first detected an expression of an interest in purchasing a new car (e.g., because the customer is pregnant, and the need for the new car was not urgent when the customer first found out she was pregnant). The geolocation of the consumer computing device may trigger a loan underwriting. For example, as a result of having detected that the customer computing device is at the new car dealership, the provider computing device and/or consumer computing device may calculate how much the customer can afford to pay for the new car based on the customer's current financial situation. Potentially, the customer's current financial situation may have changed in the interim (e.g., between the time the expression of interest was first detected and the time the customer computing device is detected as being at a car dealership, and/or between the time inputs indicating a customer who drives a two-seater is expecting a baby and the time the customer visits the car dealership). For example, it may be determined by the provider computing device that the customer's credit score may have improved, which would entitle the customer to a loan with a lower interest rate than previously available.

The provider computing device may determine that, based on database records of the provider, the customer's internal credit score (e.g., internal to the provider based on the customer's financial behaviors as a customer of the provider who may be a financial institution), current budget, and spending patterns that the customer is approved for a car loan. The provider computing device may, via the consumer computing device, provide the customer with the option to accept the loan. The loan may be underwritten in response to the detection that the consumer computing device is physically located at a particular place. If the consumer computing device receives an indication that the customer is not ready to purchase a new car, the fact that the underwriting occurred based on internal data of the provider (rather than, e.g., on records of a third-party credit agency) avoids an impact on the customer's credit score.

The provider computing device may transmit to the consumer computing device a message indicating how much the customer is deemed to be able to afford based on her current financial situation. The transmitted message may advise the customer is pre-approved for a loan at the determined amount. If the consumer computing device receives an acceptance, the provider computing device may update the customer's financial plan based on the new loan. Concurrently, the provider computing device may also access third party APIs of other car dealerships in town or otherwise accessible based on the location of the consumer computing device. Potentially, at the first car dealership, the customer may not find any new cars in her price range that fit her needs. In one possible scenario, the result may be that the customer purchases a car that fits her needs but is not in her price range. Instead, however, the provider computing device may have accessed APIs of other nearby car dealerships (identified, e.g., by the provider computing device as being near the geo-location of the customer computing device as detected using a location mechanism) and transmitted a message to the consumer computing device that other car dealerships have cars that meet the customer's needs and that are in her price range. As a result, the customer may obtain what she needs at a price she can afford based on her financial circumstances, without overpaying.

The disclosed example approach may include a motivational user interface feature. For example, the provider computing device may pre-qualify the customer for a loan based on the customer's internal credit score (e.g., financial patterns with the provider), without going to credit agencies to pull the customer's credit score. As a result, the provider computing device could dynamically update the amount for which the customer is approved each time the provider computing device and/or consumer computing device engages in a transaction on behalf of the customer. The provider computing device may transmit, or otherwise make accessible, the updated amount to the consumer computing device. For example, if the customer took an action that had a favorable result on the customer's credit score (e.g., made an on-time or additional payments towards a debt) via the consumer computing device, the consumer computing device may receive immediate favorable feedback in response to the action being taken. The feedback provided via the consumer computing device may originate with the provider computing device. As an example message, the consumer computing device may provide a message via, for example, a pop-up notification, access to an application running on the consumer computing device, or via another messaging mechanism (such as a pop-up notification or text message stating "With your new lower interest rate due to your improved credit score, you can now afford a car that costs 27,500!"). The immediate positive feedback may be deemed helpful in terms of motivating the customer to improve his or her credit score and reaching his or her ultimate financial goal (e.g., of purchasing a new car, a new home, expensive jewelry (such as a wedding ring), vacation, etc.).

Embodiments and implementations of the systems and methods disclosed herein improve current computing systems by providing proactive and pervasive user experiences for major purchases via dynamically-updated financing options that do not impact a customer's external credit score, and that allow for proactive and versatile loan underwriting in response to detection of the location of computing devices. In some implementations, financial goals affecting multiple users may be identified based on, for example, already-known associations of computing devices of existing customers with a provider computing system and/or with an authentication circle. Identities may be verified in various ways to prevent fraudulent activity and to ensure that each person who interacts with the proactive listening bot operates under the proper security roles and permissions. A "ubiquitous" proactive listening bot (i.e., a bot that may be configured to detect signals using multiple or all computing devices of one or more customers (and/or members of an authentication circle) at all times or until turned off or otherwise deactivated) can be structured to identify financial goals and needs such as making a large purchase (for which customers often borrow money), including goals and needs users may not be able to identify for themselves due to a lack of information or time to devote.

Further, the disclosed approach improves computing systems by using one or more computing devices to interact with a user (e.g., a customer) via voice recognition and analytics that pervasively and interactively provide financial planning advice, loan underwriting, and identification of suitable options to users. Rather than requiring a user to dedicate time and computing resources to determining one's financial means (e.g., how much of a loan the customer may qualify for and at what rate) and researching available options (e.g., what products meet the customer's needs in the short and/or long term), user computing devices can acquire the information without requiring the user to dedicate time or otherwise change daily activities. User computing devices are not limited to single, one-time statements in determining customer goals and needs (e.g., what car, house, or other major expenditure would be most sensible based on the customer's familial or other needs and financial circumstances), but can obtain the needed information over the course of a day, a week, a month, or longer, based on multiple conversations with family and friends (and/or with members of one or more authentication circles with which the user is associated), consultations with advisors, and/or other activities. By receiving dynamically updated information on available loans without an impact on external credit score, and receiving loan underwriting in an automated fashion based on location, the customer can save time and computing resources while making more informed decisions. Systems, methods, and computer implementations disclosed herein improve the functioning of such systems and information management by providing unconventional, inventive functionalities that are novel and non-obvious improvements over current systems.

Referring to FIG. 1, a block diagram of a major expenditure advising system 100 is shown according to one or more example embodiments. As described herein, the major expenditure advising system 100 enables the implementation of pervasive user experiences involving advising regarding, and timely and flexible loan underwriting for, major expenditures. The advising received for major purchases may be robo-advising, human advising, or a combination thereof. As used herein, robo-advising, bot advising, robot advising, and like terms refer to advising that does not involve interaction with, or intervention by, a person. Robo-advising may be implemented using one or more mobile or non-mobile computing devices capable of acquiring inputs from a user (e.g., a user's communications) and automatically performing actions, or providing recommendations for future actions by the user, that affect the user's circumstances. The robo-advising may be accomplished using, for example, artificial intelligence tools, intelligent agents, machine learning, or other logic and algorithms capable of extracting relevant information from input streams that include both relevant and non-relevant information (e.g., conversations that may span multiple days and cover related and unrelated topics).

The major expenditure advising system 100 includes one or more provider computing devices 110 (of one or more service providers), one or more consumer computing devices 120 (of one or more users receiving one or more financial or other services from the service provider), one or more advisor computing devices 130 (of one or more persons who advise users, and who may or may not be associated with the service provider), and one or more third-party computing devices 140 (of entities that are separate from the service provider and that have information relevant to major expenditure advising). Each provider computing device 110, consumer computing device 120, advisor computing device 130, and third-party computing device 140 may include, for example, one or more mobile computing devices (e.g., smartphones, tablets, laptops, smart devices such as home smart speakers and watches, etc.), non-mobile computing devices (such as desktop computers, workstations, servers, etc.), or a combination thereof.

Provider computing devices 110, consumer computing devices 120, advisor computing devices 130, and third-party computing devices 140 may be communicably coupled to each other over a network 150, which may be any type of communications network. The network 150 may involve communications using wireless network interfaces (e.g., 802.11X, ZigBee, Bluetooth, near-field communication (NFC), etc.), wired network interfaces (e.g., Ethernet, USB, Thunderbolt, etc.), or any combination thereof. Communications between devices may be direct (e.g., directly between two devices using wired and/or wireless communications protocols, such as Bluetooth, WiFi, NFC, etc.), and/or indirect (e.g., via another computing device using wired and/or wireless communications protocols, such as via the Internet). The network 150 is structured to permit the exchange of data, values, instructions, messages, and the like between and among the provider computing devices 110, the consumer computing devices 120, the advisor computing devices 130, and the third-party computing devices 140 via such connections.

Figure 2:
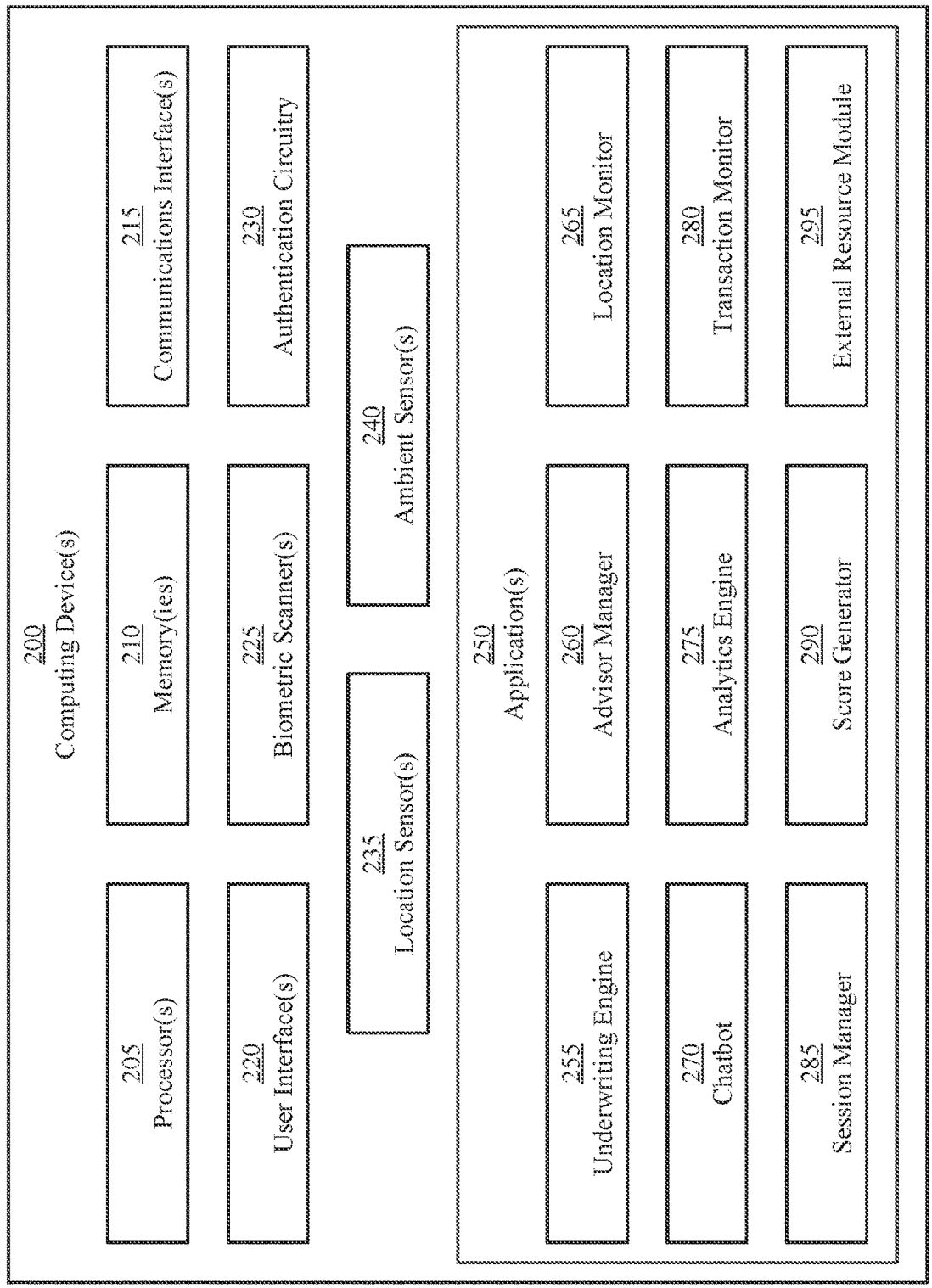
FIG. 2 is a block diagram for example components that could be incorporated in the computing devices of the computing system framework of FIG. 1 according to example embodiments.

Referring to FIG. 2, computing device 200 is representative of example computing devices that may be used to implement major expenditure advising system 100, such as one or more provider computing devices 110, consumer computing devices 120, advisor computing devices 130, and/or third-party computing devices 140. Not every provider computing device 110, consumer computing device 120, advisor computing device 130, and third-party computing device 140 necessarily requires or includes all of the example device components depicted in FIG. 2 as being part of computing device 200. Multiple computing devices 200 (each with a potentially different set of components, modules, and/or functions) may be used by one service provider (e.g., a financial institution providing financial and other services), one user (e.g., a customer receiving financial advice), one advisor (e.g., a professional who provides financial advice suited to a customer's circumstances), or one third party (e.g., a credit agency, government agency, merchant, or other source of information or provider of services). Similarly, one computing device 200 may be used by multiple service providers, multiple users, multiple advisors, or multiple third-parties.

Each computing device 200 may include a processor 205, memory 210, and communications interface 215. Each processor 205 may be implemented as a general-purpose processor, an application specific integrated circuit (ASIC), one or more field programmable gate arrays (FPGAs), a digital signal processor (DSP), a group of processing components, or other suitable electronic processing components structured to control the operation of the computing device 200. The memory 210 (e.g., RAM, ROM, NVRAM, Flash Memory, hard disk storage) may store data and/or computer code for facilitating at least some of the various processes described herein. In this regard, the memory 210 may store programming logic that, when executed by the processor 205, controls the operation of the computing system 200. Memory 210 may also serve as one or more data repositories (which may include, e.g., database records such as user and account data and data acquired from various sources). The communications interface 215 may be structured to allow the computing device 200 to transmit data to and receive data from other mobile and non-mobile computing devices (e.g., via network 150) directly or indirectly.

Each computing device 200 may include one or more other components (generally involving additional hardware, circuitry, and/or code) depending on the functionality of the computing device 200. User interfaces 220 include any input devices (e.g., keyboard, mouse, touchscreen, microphone for voice prompts, buttons, switches, etc.) and output devices (e.g., display screens, speakers for sound emission, notification LEDs, etc.) deemed suitable for operation of the computing device 200. Computing device 200 may also include one or more biometric scanners 225, such as fingerprint scanners, cameras for facial, retinal, or other scans, microphones for voice signatures, etc. In conjunction with, or separate from, the biometric scanners 225, each computing device 200 may include authentication circuitry 230 to allow the computing device 200 to engage in, for example, financial transactions (such as mobile payment and digital wallet services) in a more secure manner. Various computing devices 200 may include one or more location sensors 235 to enable computing device 200 to determine its location relative to, for example, other physical objects or relative to geographic locations. Example location sensors 235 include global positioning system (GPS) devices and other navigation and geolocation devices, digital compasses, gyroscopes and other orientation sensors, as well as proximity sensors or other sensors that allow the computing device 200 to detect the presence and relative distance of nearby objects and devices. Computing device 200 may also include ambient sensors 240 that allow for the detection of sound and imagery, such as cameras (e.g., visible, infrared, etc.) and microphones, in the surroundings of computing device 200. A computing device's microphone may be considered an ambient sensor that could also be used as a biometric scanner if it is involved in capturing the voice of a user for authentication purposes, and/or a user interface if the microphone is involved in receiving information, commands, or other inputs from, for example, speaking users.

Each computing device 200 may include one or more applications 250 ("apps") that aid the computing device 200 in its operations and/or aid users of the computing device 200 in performing various functions with the computing device 200. In some implementations, applications 250 may be stored in memory 210 and executed using processor 205, and may interact with, or otherwise use, one or more of communications interfaces 215, user interfaces 220, biometric sensors 225, authentication circuitry 230, location sensors 235, and/or ambient sensors 240. Not every provider computing device 110, consumer computing device 120, advisor computing device 130, and/or third-party computing device 140 necessarily requires or includes all of the example application components/modules depicted in FIG. 2 as being part of application 250.

Example components of one or more applications 250 (running on, e.g., provider computing device 110, consumer computing device 120, and/or advisor computing device 130) include an underwriting engine 255 configured to underwrite loans for major expenditures. The loan underwriting may be based on a customer's financial circumstances, goals, needs, and plans, as well as the location of a computing device 200 associated with the customer. For example, the underwriting engine 255 (running on provider computing device 110 and/or consumer computing device 120) may use location sensors 235 to determine that a customer is located at or moving towards a location corresponding with a customer's desire or intent to engage in a transaction related to a major expenditure. The location may be, for example, a car dealer, a for-sale house, an office of a realtor or agent for houses being newly constructed (which may be, e.g., a model home for a new housing development), a jewelry store, a travel agent, etc. The customer's desire or intent to engage in a transaction may be based on various inputs, such as conversations of the customer detected using ambient sensors 240. The underwriting engine 255 may determine that a desired purchase may be procured at the location based on, for example, information on the location acquired via access to third-party computing devices 130. For example, a directory may be accessed, or a website of a business in the vicinity of the consumer computing device 120.

In some implementations, the computing device 200 (e.g., provider computing device 110 and/or consumer computing device 120) may first identify a location at which a customer may make a major purchase, and then cross-reference the sort of items available at the location with the customer's desires, intent, goals, and/or needs (which may be, or may have been, determined using inputs previously acquired via the computing device 200). For example, the consumer computing device 110 may, as a matter of course, check on its location using its location sensors 235 periodically. The frequency of the location checks may be based on various factors, such as: expressions of intent (e.g., the customer expresses a desire to visit a car dealership in a conversation with a friend or family member); whether the consumer computing device 120 is detected to be moving above a certain velocity (e.g., while driving 25 miles per hour (mph) or faster, while walking 5 mph or faster on foot, etc.); whether the consumer computing device is moving in a certain direction (e.g., towards a relevant location corresponding with a transaction point involving a major expenditure); etc.

For example, in certain implementations, the consumer computing device 120 may determine that the current date corresponds with a day on which the customer specifically expressed a desire or intent to visit a car dealer or other transaction point. Similarly, the consumer computing device 120 may determine that it is currently a non-work day or non-work hour after the customer expressed a general desire or intent to visit one or more car dealers. That it is a non-work day or non-work hour may be determined in various ways. For example, in various implementations, it may be determined that it is a non-work day or non-work hour using customer data available to the provider computing device 110, various inputs from the customer, and/or information from third party computing devices 140, such as social networking sites. The consumer computing device 120 may, in such circumstances, ping location sensors 235 more frequently than on other days or times. Alternatively or additionally, while the consumer computing device 120 is detected to be moving at least a certain speed (e.g., 25 mph, 35 mph, 55 mph, etc.), location may be checked more frequently than when the consumer computing device is not moving or is moving more slowly (because, e.g., it may be presumed that if the consumer computing device 120 is moving, it could head towards location at which a major purchase may be made). Similarly, if the consumer computing device 120 is traveling towards a commercial district known to have merchants relevant to a customer goal, then the consumer computing device 120 may ping location sensors 235 more frequently than it would otherwise. Example frequencies include once or twice a minute, every 5 minutes, every 30 minutes, or other intervals deemed suitable.

If the provider computing device 110 and/or consumer computing device 120 determines that the consumer computing device 120 is approaching a relevant location (e.g., is entering a car dealership or other transaction point such as a merchant, a for-sale house, etc.), the underwriting engine 255 (e.g., an application 250 running on the provider computing device 110) may determine a suitable amount and interest rate for a loan to the customer for a major expenditure corresponding to the location. The suitable amount and interest rate may be determined (by, e.g., the provider computing device 110) based at least in part on what the major expenditure is and on the financial circumstances and behavior of the customer. If the provider is a financial institution and the customer has accounts with the provider, or if the provider otherwise has access to a sufficient amount of information related to the customer's financial information and behaviors, the provider computing device 110 may determine the loan amount and interest rate based on internal data. Advantageously, by not accessing the customer's credit score as determined by a credit agency, and instead using internal data, underwriting of the loan need not impact the customer's external credit score.

An advisor manager 260 may be configured to determine whether or when it is advisable to transition a user between robo-advising and human advising based on one or more transition triggers (which are further discussed below). For example, the advisor module 260 (running on provider computing device 110 or consumer computing device 120) may use inputs to determine that it is appropriate to transition a user computing device 120 from robo-advising to human advising based on one or more human advising triggers, and from human advising to robo-advising based on one or more robo-advising triggers. Such "go-human" triggers may indicate that a need or goal of a user is sufficiently complex, variable, unpredictable, or significant so as to warrant input from or review by a human advisor. For example, human advising triggers may indicate that two or more options are available for a user, with the options sufficiently divergent (i.e., having substantially different consequences depending on factors beyond the purview of the robo-advisor, and/or requiring subjective evaluation of a user's circumstances) to warrant human intervention. Example go-human triggers may include: a transaction exceeding a threshold value (e.g., purchasing a car or home of at least a certain value); a conversation determined to indicate that a situation is very emotionally charged (based on, e.g., above-average volume for the voice of the speakers, detection of tension in voices, and/or identification of a major life event); extensive communications about a topic, suggesting that the user is weighing many factors because a major expenditure is significantly nuanced or particularly personal; use of predetermined keywords or phrases associated with topics outside the purview of the robo-advisor; expression of a desire to speak with a professional advisor; etc. Go-human triggers may be identified in, for example, conversations or other communications of the customer with other users and/or with a chatbot.

Similarly, the advisor module 260 (running on, e.g., provider computing device 110, user computing device 120, and/or advisor computing device 130) may determine, during a communications session between a customer and an advisor, that the customer may have reached a point that no longer requires human intervention, or that a return to robo-advising may otherwise be a viable option, based on one or more triggers for robo-advising. Such "back to bot" triggers may, for example, indicate that the motivation for transitioning to human advising may no longer be relevant (e.g., an issue has been resolved or otherwise sufficiently addressed, one or more accounts have been set up and/or restructured, etc.), that the topics being discussed are all in the purview of the robo-advisor, and/or that the conversation has become non-financial in nature (e.g., the user and advisor have concluded a discussion of life events or financial situations and are only discussing news or sports). In some implementations, if the topics being discussed during a human-advising session have no go-human triggers (such that if the discussion had been detected outside of the session with the advisor, the robo-advisor would not have determined that human intervention or review is warranted), then the advisor manager 260 may determine that a return to robo-advising is appropriate. Back-to-bot triggers may be identified in, for example, conversations or other communications of the customer with the advisor, such as entries while interacting with a user dashboard during a session with the advisor.

The advisor manager 260 may further be configured to identify one or more advisors that may be able to assist a user based on the user's needs and/or goals, and to schedule a meeting or other communications session with the advisor (by, e.g., comparing the user's and advisor's calendars to determine mutual or overlapping availability). For example, if the provider computing device 110 and/or consumer computing device 120 determines that the customer would likely benefit from human advising, or it is otherwise determined that the major expenditure (e.g., buying a home) is well suited for human advising, the advisor manager 260 may access records stored at a provider computing device 110, an advisor computing device 130, and/or a third-party computing device 140 to determine which advisors may have the background and experience suited to the customer's needs and goals. The advisor manager 260 may also access records (e.g., transcripts) of prior sessions of an advisor (with the same or with other users) to determine whether the advisor would be a good match with the user of the consumer device 120. The ultimate suitability of an advisor may sometimes be based, at least in part, on whether the calendars reveal mutual/overlapping availability for the consumer and the advisor (even if otherwise matched based on needs and expertise). The advisor manager 260 may access one or more calendars accessible to one or more consumer devices 120 to determine the customer's availability. In some implementations, the advisor manager 260 may determine the customer's availability based on discussions of the user (e.g., detecting via a consumer device 120 that the customer stated "I'm available all day Friday") or other communications. The advisor manager 260 may access one or more calendars accessible to provider computing device 110, advisor computing device 130, and/or third-party computing device 140 to determine the availability of one or more advisors. Computing devices with separately-maintained calendars may interface with each other using, e.g., any combination of one or more application programming interfaces (APIs), software development kits (SDKs or devkits), or other hardware/software mechanisms that facilitate data exchange or communication between and among co-located or remote computing systems with various access protocols.

A location monitor 265 may be configured to determine the location of, for example, consumers and advisors, as well as the locations associated with customer transactions (e.g., where a transaction took place). The location monitor 265 may be configured to track (using, e.g., one or more location sensors 235) the physical location of computing device 200. The location monitor 265 may be configured to identify the location of the computing device 200 at specified points in time or when triggered by identified events, such as the location of the consumer computing device 120 when a purchase occurs, when a device is turned on or off, when an application is launched, etc. The location of computing device 200 may be presumed to correspond with the location of one or more users associated with the computing device 200, and/or the location at which an event occurred. In different implementations, location may be determined without using location sensors 235. For example, location of computing device 200 may be determined by determining the location of a merchant at which a purchase occurred using a payment app running on computing device 200. Additionally or alternatively, location may be determined using other sensors, such as ambient sensors 240 used to detect sounds and videos that are recognized as indicative of a certain physical location of the computing device 200 (e.g., detection of spoken words or phrases from which location may be inferred, or detection of sounds from a public announcement system of a particular landmark such as a train station or airport). Also, a location of a first computing device may be determined based on (geographically-limited) communications (such as NFC, Bluetooth, WiFi) of the first computing device with a (nearby) second computing device (such another user's smartphone, the router of a hotel or restaurant, etc.) for which location has already been determined or is known or presumed.

A chatbot 270 may be configured to simulate a conversation between a customer and advisor. Such a conversation may be conducted by, for example, capturing a customer's spoken words (or other communications), analyzing the communication to better understand context and identify user needs, and responding to the customer or otherwise providing information determined to be relevant. In some implementations, inputs (or a portion thereof) received via chatbot 270 may be fed to analytics engine 275 for analyses and formulation of responses. Alternatively or additionally, chatbot 270 may perform the analyses needed to formulate suitable responses to users. In certain implementations, certain analyses may be performed by chatbot 270 (e.g., determining what a user is asking and identifying when a financial issue has arisen), while other analyses (e.g., determining what recommendation would be suitable based on the financial issue and the user's circumstances, behaviors, etc.) may be performed via analytics engine 275.

The analytics engine 275 may be configured to enable artificial/machine intelligence capabilities by, for example, analyzing customer and advisor inputs (to, e.g., determine user goals and needs) and generating recommendations and proposals for presentation to the customer (to, e.g., achieve goals and/or satisfy needs). The analytics engine 275 may utilize, for example, artificial intelligence and machine learning tools to analyze customer conversations or other inputs and otherwise provide robo-advising without human intervention.

A transaction monitor 280 may be configured to identify and keep track of financial or other transactions of users. A customer may engage in transactions using, e.g., mobile payment and digital wallet services, or via any app and/or device through which a user may make purchases, transfers, deposits, cash advances, etc. The transaction monitor 280 may access such sources as user accounts (e.g., bank accounts, brokerage accounts, credit card accounts, merchant accounts, etc.) and payment/wallet applications to acquire data on transactions. Transaction data acquired via transaction monitor 280 may be used, for example, by analytics engine 275 to determine progress towards a goal of making a major purchase, and/or by underwriting engine 255 to determine how much of a loan (and at what interest rate) the customer may qualify for without knowing a credit score from a credit agency.

A session manager 285 may be configured to initiate and terminate communications sessions between consumer computing devices 120 and advisor computing devices 130. Such advising sessions may incorporate one or more of audio, video, and text entries of users and advisors. In some implementations, advising sessions may be conducted via the same dashboard (e.g., from within the same application) through which the user is robo-advised. Advising sessions may begin at times scheduled via advisor manager 260, and/or on an ad-hoc basis.

A score generator 290 may generate and update internal customer scores for use in determining creditworthiness, progress towards a goal of making a major purchase, etc. In various versions, the score generator 290 may use data stored at or accessible to the provider computing device 110 (e.g., account balances, purchase history, indebtedness, etc.) to evaluate how much of a loan the customer could afford and what interest rate may be warranted. In some implementations, the score generator 290 may use, for example, data from transaction monitor 280 to evaluate the spending habits of a customer. Data from third party computing devices 140 may also be used, such as financial information accessible to other financial institutions, credit scores acquired from credit agencies, etc. The score generated by score generator 290 could use any scale and have any ranges or categories deemed useful. In certain implementations, the score may be used by the underwriting engine 255 to determine a suitable amount and interest rate for, for example, a car or other loan to the customer.

An external resource module 295 may be configured to access data from information sources other than the provider computing device 110 and the consumer computing device 120. In some implementations, the external resource module 295 may use, for example, any combination of one or more APIs, SDKs, or other hardware/software mechanisms that facilitate data exchange or communication between and among co-located or remote computing systems with various access protocols. Alternatively or additionally, the external resource module 295 may access publicly-available information sources. External resources may include financial product websites, merchant websites, and other sources of information on available products (e.g., alternative major expenditures). In certain implementations, the external resource module 295 may access social networking websites for information on, for example, life events and familial or other relationships to understand (in an automated fashion) the needs, circumstances, and likely goals of a user (e.g., information on who might be affected by the financial decisions of a user, such the user's children). The external resource module 295 may similarly access other sources of information, such as credit agencies, news sources, financial institutions, governmental bodies, etc. Information from such sources may provide inputs to the analytics engine 275 to inform the robo-adviser in making recommendations as to, for example, financial goals and changes thereto. The information may also be made available to human advisors to assist with advising sessions.

Although the above discussion identifies a set of modules that perform specified functions, in various implementations, the above (and other) functions may be performed by any module in the system 100. Functions performed by the modules discussed above may be redistributed (i.e., differently apportioned or distributed) among the modules of applications running on provider computing devices 110, consumer computing devices 120, advisor computing devices 130, and/or third-party computing devices. Similarly, the functions discussed may be consolidated into fewer modules, or expanded such that they are performed by a greater number of (separate) modules than illustrated above. For example, functions performed by the above-identified modules of one or more provider computing devices 110 could additionally or alternatively be performed by modules of one or more consumer computing devices 120, and functions performed by the above-identified modules of one or more consumer computing devices 120 could additionally or alternatively be performed by modules of one or more provider computing devices 110.

Figure 3:
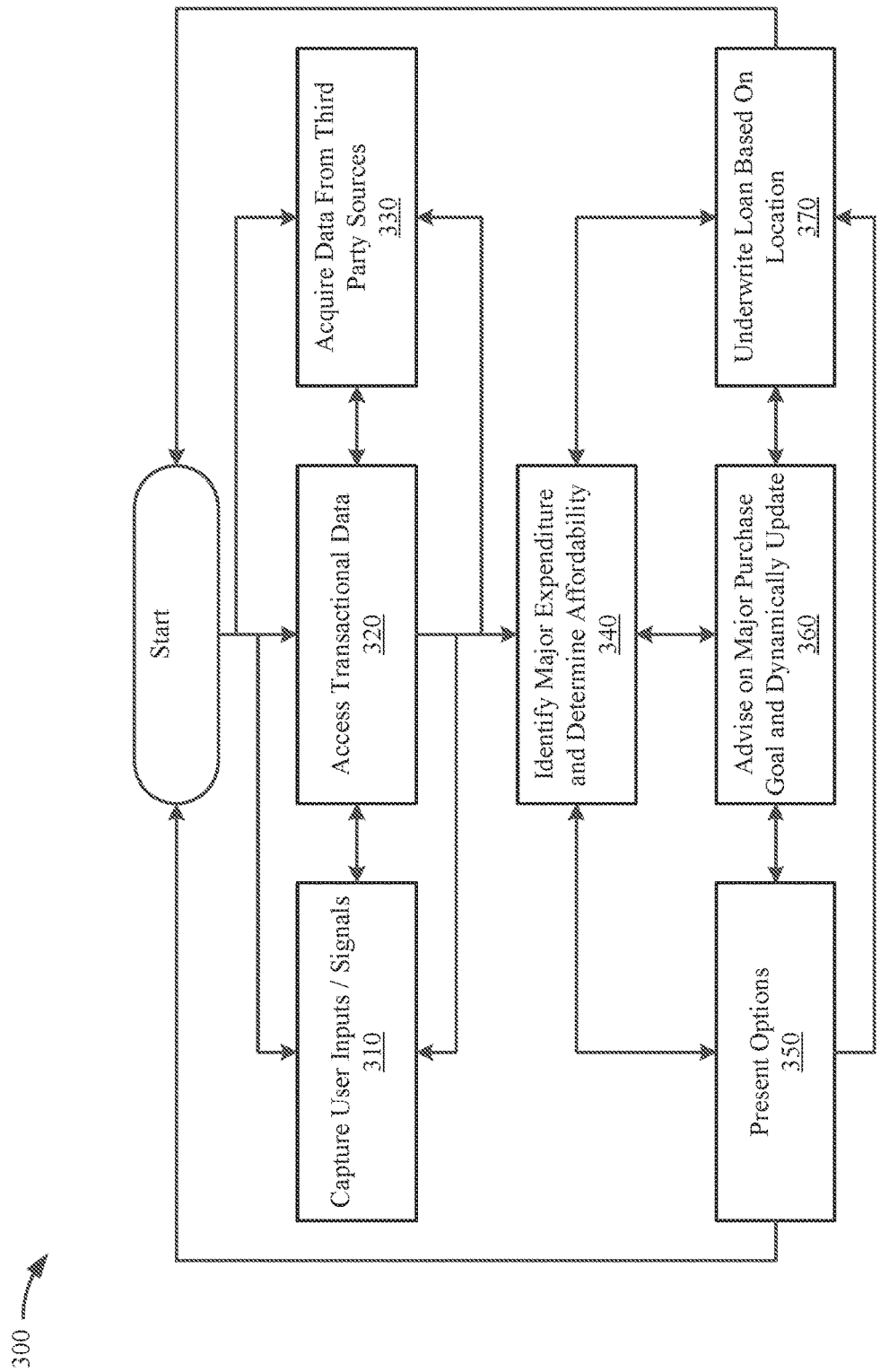
FIG. 3 depicts an example method of advising a user according to example embodiments.

Referring to FIG. 3, various versions of example process 300 may be implemented using, for example, a provider computing device 110, a consumer computing device 120, and an advisor computing device 130. At 310, one or more computing devices 200 (e.g., consumer computing devices 120 and/or, in some implementations, provider computing device 110) may be used to capture user inputs. User inputs may include conversations (e.g., spoken conversations or discussions in electronic messages) captured via computing devices 200, entries submitted via application 250, or any other transfer or exchange of data from the user to the computing device 200 and/or between computing devices 200. For example, application 250 running on consumer computing device 120 may detect (using microphones of one or more consumer computing devices 120) that a customer is discussing a major expenditure. In some implementations, a provider computing device 110 may receive audio of a conversation from a consumer computing device 120 for analysis, and/or a consumer computing device 120 may itself analyze audio of conversations. In certain implementations, particular keywords or phrases may be deemed to indicate a potential desire or need for a major expenditure. Examples include: "We're going to need a bigger car"; "I would like to go on a vacation/I need a vacation"; "Honey, we need a house with more bedrooms with another kid on the way/with your mother moving in"; etc.

Additionally or alternatively, at 320, one or more computing devices 200 may access records on financial or other transactions of the user to identify transactions indicative of a user need or goal (such as baby supply purchases indicative of a growing family and a potential goal or need to purchase a new car). In some implementations, such transactions may be detected via, for example, application 250 running on, for example, a consumer computing device 120, such as mobile wallet or electronic payment application. In various implementations, such transactions may be identified by, for example, a consumer computing device 120 accessing user records maintained at or administered by a provider computing device 110 (e.g., for accounts held at a provider that is a financial institution) and/or accessing a third party computing device 140. In some implementations, such transactions may be identified by a provider computing device 110 accessing a consumer computing device 120 and/or a third party computing device 140.

At 330, one or more computing devices (e.g., provider computing device 110 and/or consumer computing device 120) may retrieve data from third party computing devices 140 that may be informative of a user's circumstances. For example, accessing a social medial account may indicate that a customer is getting married and may need to purchase a wedding ring, or that a customer is planning a vacation. Similarly, application 250 (running on, e.g., a provider computing device 110 and/or a consumer computing device 120) may access social networking applications to identify family members, life events, etc. A determination as to which third party data sources to access may be based at least in part on user inputs and/or transactional data. For example, application 250 may detect a conversation about an upcoming trip without an identification of the destination, or about an upcoming move to a new city without an identification of the city, and in response a provider computing device 110 may determine that accessing a third party computing device 140 of a social networking or other source may help identify the destination or new city.

At 340, the user inputs, transactional data, and/or third party data may be analyzed by one or more computing devices 200 (e.g., via analytics engine 275 of application 250 running on a provider computing device 110 and/or on a consumer computing device 120) to identify one or more major expenditures and how much the customer may be able to afford to spend on the major expenditures. For example, based on user inputs acquired via a consumer computing device 120, a provider computing device 110 may determine that a customer wishes to buy a new car. In response, at 350, the provider computing device 110 may present, via an application 250 running on a consumer computing device 120, a list of available cars that would be suited to the customer's family size. The options may include, for example, minivan or other family car options available from various car dealerships. In some implementations, if it is determined that the major expenditure warrants review by or discussion with a human advisor, the provider computing device 110 (presented via, e.g., application 250 running on a consumer computing device 120) may recommend engaging with a human advisor (e.g., an advisor generally, an advisor by specialty or expertise, and/or an advisor by name). The advisor manager 260 running on, for example, a provider computing device 110 and/or a consumer computing device 120 may then help the consumer computing device 120 find and connect with one or more advisor computing devices 130.

At 360, in various implementations, the consumer computing device 120 provides advice on the major expenditure. The advice may include recommendations for, for example, changing spending habits, paying off debt at a faster rate, opening savings or other accounts, transferring funds, using lower-rate credit cards, deferring a purchase, etc. Based on the customer's financial circumstances and subsequent actions (e.g., level of debt, balances in savings accounts, etc.), the provider computing device 110 may present (via, e.g., an application 250 running on the consumer computing device 120) how much the customer could afford at that time and what interest rate would apply if, for example, a loan were to be underwritten that same day, same hour, or other timeframe. In various implementations, the amount and/or interest rate would be updated in real-time or otherwise following every action of which a provider computing device 110 becomes aware. This allows, for example, a customer to see the impact of every action (e.g., making a payment, a purchase, a funds transfer, etc.) on how much the customer could afford to spend on a major purchase. Because the amount could be based on the internal score generated by score generator 290 running on provider computing device 110 (rather than on, e.g., a credit score from a credit agency), affordability could be determined more quickly and as a result of each action without waiting for the action to trickle through to the credit agency and its credit score determination.

If or when a customer wishes to proceed with the major purchase, computing device 200 (e.g., provider computing device 110 and/or consumer computing device 120) may, at 370, monitor the customer's location (via, e.g., location monitor 265). The provider computing device 110 may then (via, e.g., underwriting engine 255) underwrite a loan based on the location. For example, if the consumer computing device 120 is determined to be located at or approaching a car dealer, the underwriting engine 255 may underwrite a loan for a car for the amount that the customer could afford. Information on the seller (i.e., the recipient of the loan disbursement) could be determined by, for example, cross-referencing the location of the consumer computing device 120 with business information acquired by provider computing device 110 via one or more third party computing devices 140.

Figure 4:
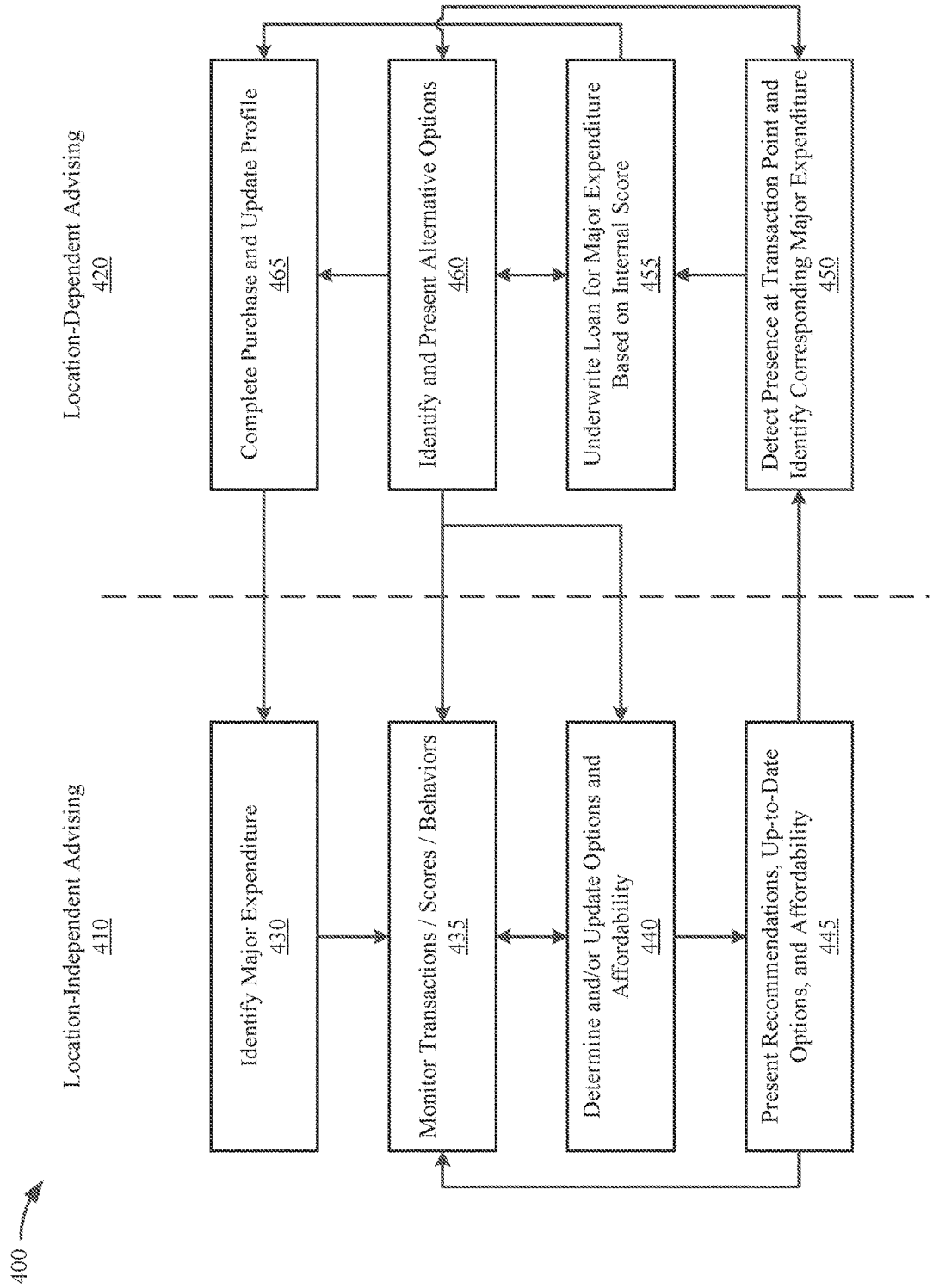
FIG. 4 depicts an example method of advising a user according to example embodiments.

Referring to FIG. 4, an example process 400 for providing location-independent advising 410 (on left side) and location-dependent advising 420 (on right side) is depicted. At 430, provider computing device 110 surveils consumer computing devices 120 and third party computing devices 140 to identify a financial goal of making a major purchase. As discussed above, this may be accomplished, for example, via channels that allow for monitoring of communications (e.g., by detecting conversations via a chatbot and/or scanning electronic messages to extract relevant data). In other implementations, the major expenditure may be identified based on a location (i.e., not location independent), such as a location of the provider computing device 110 as determined using a location sensor, and/or based on a location of a transaction (e.g., a location of a merchant at which a purchase was recently made using a mobile wallet application running on the provider computing device 110). At 435, provider computing device 110 and/or consumer computing device 120 may monitor transactions, behaviors, patterns, actions, etc. that could affect the customer's internal score or otherwise the amount that the customer could afford. At 445, the provider computing device 110 (via, e.g., application 250 running on the consumer computing device 120) may present one or more recommendations for achieving the goal of making the major purchase. The consumer computing device 120 may also present options (e.g., available cars, homes, jewelry, etc., acquired via third party computing devices 140) and up-to-date information on how much the customer is deemed to be able to afford (e.g., how much of a loan would currently be underwritten by the provider and at what interest rate).

At 450, the provider computing device 110 and/or consumer computing device may determine the presence of the consumer computing device 110 at a transaction point (e.g., a point of sale for major expenditures, such as a car dealership). At 455, underwriting engine 255 (running on, e.g., provider computing device 110) may underwrite a loan for the major purchase corresponding to the transaction point and to the customer's goals and needs. Alternatively or additionally, at 460, the provider computing device 110 and/or consumer computing device 120 may present other options (e.g., other cars available at the same or other dealers) that meet or exceed the customer's needs and that do not cost more than the amount deemed affordable for the customer. Once the alternatives have been presented, at 450, the location of the consumer computing device 120 would again be monitored to determine if the customer has, for example, left one dealer and is headed to another dealer. In response to detection at a new transaction point, at 545, a new loan may be underwritten corresponding to a purchase from, for example, the alternative dealer. At 465, the purchase may be completed and the provider computing device 110 and/or consumer computing device 120 may update the customer's profile to reflect the purchase.

Figure 5:
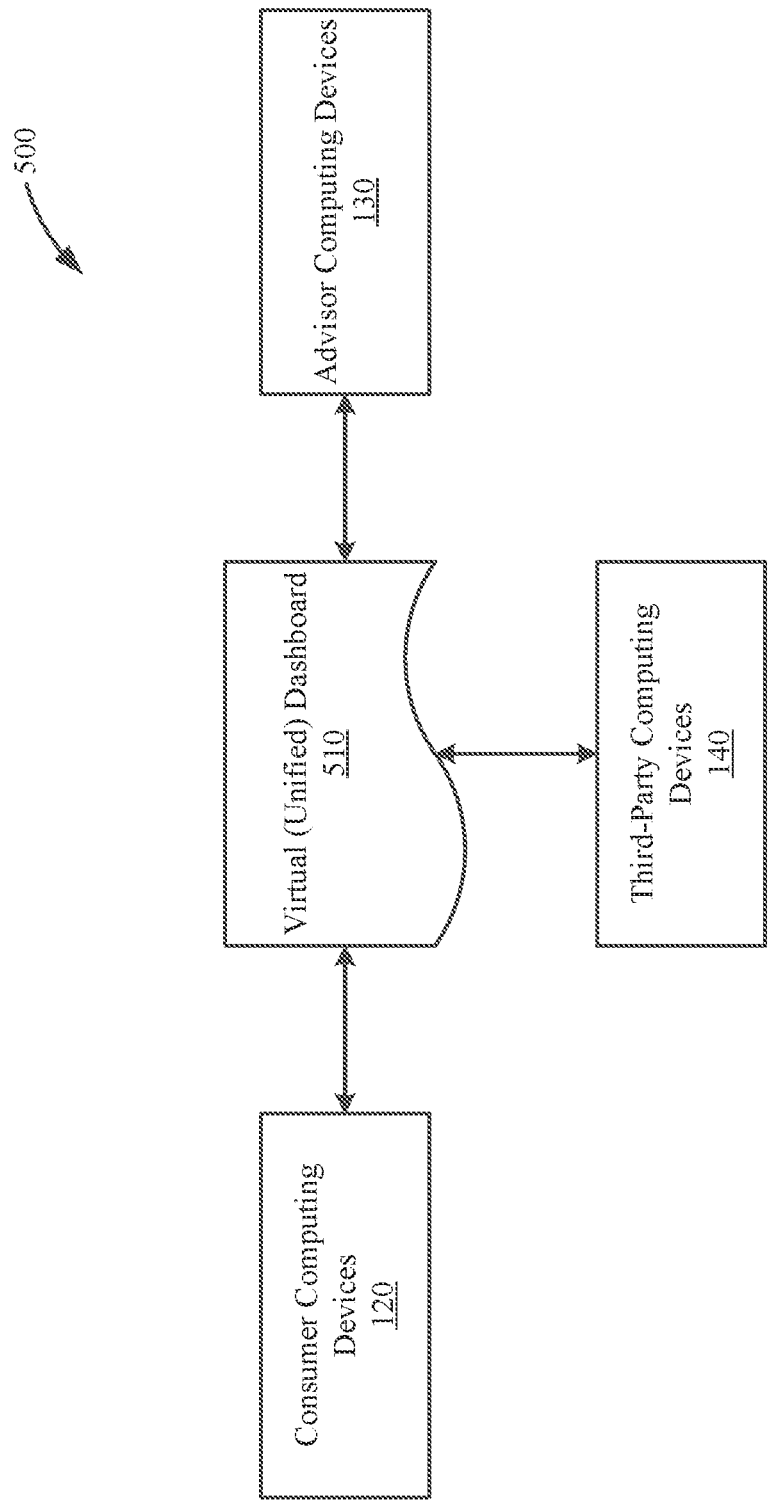
FIG. 5 depicts an implementation of an example pervasive advising system with a virtual dashboard according to example embodiments.

Referring to FIG. 5, in example implementations, a system 500 may include a virtual dashboard 510 (see, e.g., FIGS. 8-17 discussed below) that is accessible to one or more consumer computing devices 120 and one or more advisor computing devices 130. The dashboard 510, which may be maintained and/or administered using one or more provider computing devices 110 of a service provider, may be "unified" in the sense that it allows consumer computing devices 120 and advisor computing devices 130 to effectively exchange information in the same virtual environment. Because customers and advisors may interact with each other via, for example, user interfaces with common elements, and both users and advisors may be able to readily access at least some (if not all) of the same information and user interface elements, advisors may more easily learn of a customer's circumstances (goals, needs, etc.) via dashboard 510. This may help save consumers and advisors from needing to devote a substantial amount of resources (time, computing resources, etc.) to bring an advisor "up to speed." Users need not spend time explaining their unique situations by sharing details that have already been entered or otherwise provided by the user or acquired from various information sources (such as third-party computing devices 140). A common dashboard helps discussions by allowing customers and advisors to refer to the same user interface elements. Moreover, familiarity with the dashboard allows the customer and advisor to more readily access and provide information that is relevant to different topics being discussed or otherwise addressed. The unified dashboard 510 may help provide for smoother transitions between robo-advising and human advising.

In certain implementations, the provider computing system 110 may maintain a user profile (further discussed below) that may include relevant financial information, user preferences, triggers for transitioning between robo-advising and human advising, and other data. The provider computing system 110 may use user profiles to assist with the implementation of dashboard 510. Consumer computing devices 120 can be provided access to the dashboard 510 to receive recommendations, review conversations, enter additional information, monitor progress towards goals, request and schedule human advising sessions, etc. Advisor computing devices 130 may be used to access consumer data, schedule advising sessions with consumers, provide additional recommendations, monitor and update goals, etc. The user profile may include parameters for what information is accessible, when transitions are advisable, etc., further helping make transitions smoother.

Referring to FIG. 6, illustrated is an example profile 600 that may, in certain implementations, be generated and/or maintained by provider computing devices 110 for use by provider computing devices 110, consumer computing devices 120, and/or advisor computing devices 130. This profile may be saved in memory as database records, data packets, text files, or in other suitable formats.

As discussed above, an advisor module 260 may determine that it is appropriate to transition a user computing device 120 from robo-advising to human advising to better assist a customer. To facilitate such determinations, profile 600 may include go-human triggers 605 (discussed above) to assist with the identification of a situation in which a human advisor may be suitable. Go-human triggers 605 may, for example, be unique to the specific customer based on past behaviors (e.g., if a customer has sought human assistance when a certain issue arises or with respect to certain major purchases, the issue/behavior may indicate a go-human trigger 605). Triggers 605 may also include customer inaction in response to certain life events (e.g., a growing family) and/or in response to certain recommendations in situations (which may be unique to a customer) deemed to be significant enough to warrant action sooner rather than later (based on, e.g., certain detected inputs).

Similarly, the advisor manager 260 may determine a return to robo-advising may be appropriate based on back-to-bot triggers 610 (discussed above). Back-to-bot triggers 610 may be based on, for example, certain behaviors of the customer. For example, if a customer is detected to routinely (and in a sufficiently timely manner) handle certain financial situations without advising sessions with advisor computing devices 130, then identification of the financial situation may be a back-to-bot trigger that indicates it may be suitable to allow the customer to continue on a robo-advising track or otherwise without human discussion for the time being. Back-to-bot triggers may alternatively or additionally be based on a customer's savviness, expertise, or familiarity with certain situations. For example, if a customer is determined to be sophisticated with respect to certain financial situations, then identification of the corresponding financial situations may indicate that robo-advising may be suitable. In some implementations, a customer's savviness or ability to handle a situation may be determined, for example, via an evaluation (e.g., using analytics engine 275 running on provider computing device 110, consumer computing device 120, and/or advisor computing device 130) of the customer's sophistication with respect to certain issues. Sophistication may be based on, for example, how advanced the language used by the customer is with respect to an issue. For example, a customer who is detected to discuss available options with respect to a certain financial situation with a family member (and/or a member of an authentication circle to which the customer belongs) may be deemed more sophisticated than a customer who is detected only to discuss the circumstances of the financial situation with no talk of viable options for how the customer may proceed. Sophistication (in general or specific to financial issues/situations) may be stored in one or more fields of profile 600 to help with advising generally and to help make transitions between robo-advising and human advising more effective.

In certain implementations, fragmented issue indicators 615 may be used to allow provider computing device 110 and/or user computing device 120 to track and connect inputs over time (as being related or otherwise as building upon each other to form a better picture of circumstances or otherwise better inform advising). In some situations, a person's needs or goals do not become apparent in one conversation, statement, communication, transaction, or other act. For example, the keywords and/or phrases that indicate a user has a certain need or goal may not be detected as part of a single conversation or otherwise within a short period of time. Needs or goals may unravel over time (hours, days, weeks, months, etc.) as a consumer obtains more information and/or contemplates his or her situation based on new events and available information. And the bases for such goals and needs may go unexpressed or otherwise remain unapparent for some time.

For example, a consumer computing device 120 may detect a customer explaining to a friend that his or her mother had a bad fall, and may detect, in a separate conversation with his or her sibling, the customer explaining "she's going to need someone to look after her." And the consumer computing device 120 may detect a third conversation with the customer explaining "she's moving in," and/or a fourth conversation regarding the house not being large enough and/or not having a room on the main level (so that the mother could use a room that does not require climbing stairs). Separately, these inputs may be insufficient to identify a financial goal or need and make a good recommendation. However, when considered together, these two inputs may be deemed (by, e.g., analytics engine 275) to indicate that a user may need certain financial assistance or have a certain financial goal (such as a need for a larger house, or one with a main-level bedroom, because the mother is moving in).

The consumer computing device 120 (and/or the provider computing device 110 using audio or other data received via consumer computing devices 120) may (based on, e.g., detected keywords, phrases, or other signals) determine that a piece of information may potentially be relevant to whether a financial goal or need exists. If such a signal is detected, the provider computing device 110 and/or user computing device 120 may record such a signal as a fragmented issue indicator 615. Then, when a second (or third, fourth, etc.) signal that is similarly determined to include a piece of information that is potentially relevant to some financial issue is detected, the provider computing device 110 and/or consumer computing device 120 may access profile 600 for fragmented issue indicators 615 that may be relevant. If such a related fragmented issue indicator 615 is in the user's profile 600, the robo-advisor (via, e.g., the provider computing device 110 and/or the consumer computing device 120) may determine that there is a likely need, and generate an appropriate recommendation, may determine that more information (e.g., additional signals or inputs) is needed to generate a relevant or useful recommendation.

In the above example, the consumer computing device 120 and/or provider computing device 110 may identify a first signal when a phrase such as "my mother had a bad fall last night" is detected. In some implementations, application 250 may first process the signal to give the signal more meaning or clarity and/or to supplement the signal with additional information. For example, analytics engine 275 running on provider computing device 110 may analyze the phrase and retrieve information from various sources to determine who was involved (e.g., who is the speaker's mother based on user records or third party sources), on what date the fall occurred (e.g., what is the date of the day before the day on which the signal was detected), what can be predicted about the fall in the context of the conversation (e.g., if the speaker's voice indicated that the speaker was upset, the fall may be deemed to have been more serious or more recent than if the speaker's voice indicated the speaker was apparently nonchalant about the incident), what a "bad" fall might mean for a person of the mother's age or other known or determinable circumstances (e.g., the mother's age or whether such falls have occurred in the past), etc. Such information may be in the user's record or determinable from third party sources (e.g., from sources of medical information), and the fall may be deemed more serious based on certain criteria (such as the mother's age being above a certain age threshold, the mother suffering from certain conditions associated with low bone density, etc.). In various implementations, signals (detected via, e.g., provider computing device 110 and/or consumer computing device 120) need not be limited to expressions (e.g., spoken conversations or other discussions). Additionally, signals may be actions taken (using, e.g., consumer computing device 120), such as opening certain accounts, making certain funds transfers, making certain purchases, and/or traveling to certain locations (such as car dealerships, open houses, baby supply stores, assisted living homes, hospitals in general, specific clinics or doctors' offices with certain specialties, accountants' offices), etc.

The provider computing device 110 and/or consumer computing device 120 may record a fragmented issue indicator 615 following the first signal in the profile 600. In various implementations, fragmented issue indicator 615 may state, for example, a derivation of the phrase (e.g., "family member had an accident," "user's mother had a fall," etc.), the phrase itself (i.e., "my mother had a bad fall last night"), or a supplemented or otherwise revised version of the phrase (e.g., "my mother had a bad fall [on mm/dd/yyyy]," "[user name's] 'mother had a bad fall' on mm/dd/yyyy," or "[mother's name] 'had a bad fall' on mm/dd/yyyy").

Where the fragmented issue indicator 615 arises from detection of a location of the consumer computing device 120, the fragmented issue indicator 615 may include an identification of the location visited, such as "customer visited open houses at [home 1] and [home 2]" or "customer visited assisted living home [at address]." In some implementations, the identification of the location may be accompanied by an indication of the amount of time spent at the location, such as "customer spent [amount of time] at an assisted living home." In certain implementations, a visit to a location may not be deemed significant enough to warrant recording a fragmented issue indicator unless the consumer computing device 120 was detected to have remained at the location for a certain minimum amount of time. For example, a fragmented issue indicator 615 may not be triggered unless the consumer computing device 120 was detected to have remained at a relevant location a minimum of 10 minutes. In some implementations, an analytics engine 275 may decide whether to include a fragmented issue indicator 615 in profile 600 by balancing the likely relevance of a statement or a location visited, the amount of time spent at the location, and/or the likely impact on advising or needs and goals of the customer.

In some versions, fragmented issue indicators 615 may be saved as a compilation of, or otherwise associated with, multiple fields. For example, there may be "subject" or "primary" field that may be populated with a phrase or derivations thereof, identification of certain actions, or other signals. Additional example fields include: time and/or date an input was captured and/or added to profile 600; which computing device was used to capture an input; identity of a user associated with the computing device used to capture an input; location of the computing device used to capture an input; identify of the speaker or source of the input; etc. In some implementations, these may be used to give meaning to fragmented issue indicators 615 or combinations thereof.

In some implementations, a user's profile 600 includes fragmented issue indicators 615 associated with multiple users. The names of other users (e.g., family members, confidants, etc.) with whom a user is associated (such as by being in an authentication circle) may be included in profile 600 (e.g., in goals and progress 625), and fragmented issue indicators 615 may be stored in multiple profiles 600 such that any single profile 600 may include the fragmented issue indicators 615 of all associated users. For example, a first user's profile 600 may include fragmented issue indicators 615 of a second user (and vice versa) who is a family member, friend, or otherwise associated with the first user (e.g., via an authentication circle). Signals acquired from multiple individuals (stored in one or more profiles 600) may then be used by, for example, provider computing device 110 and/or consumer computing device 120 to generate recommendations.

As an illustrative example, a first signal may be based on a first input resulting from a first user (e.g., an adult child) saying "we're going to need to look after her." A second signal may be based on a second input from a second user (e.g., a parent of the adult child) saying "I had a bad fall." A third signal may be based on detection of the consumer computing device 120 being located at an open house for a house that is larger than the customer's current house and that includes a bedroom on the main floor (the sizes and layouts of the homes being determined using, e.g., third party computing devices 140 of such sources as county property records and realtors) for more than 15 minutes. These three inputs may be used to generate three fragmented issue indicators 615 that, together, identify a financial goal of buying a new house so that the mother can move in with. Advantageously, inputs related to one user's circumstances, goals, needs, etc., may be more accurately and/or quickly identified by acquiring and considering inputs from multiple user computing devices 200 associated with multiple other users (who may communicate about each other even if not directly speaking or otherwise communicating with each other). The fragmented issue indicator 615 (as well as any of the other parameters in profile 600) may also include an access permissions field that identifies which fields (if any) of the fragmented issue indicator 615 (or other parameter corresponding to the access field) are accessible to particular advisors or other users.

In some implementations, a recommendation from the robo-advisor may be based on one or more fragmented issue indicators 615. Additionally or alternatively, the provider computing device 110 and/or user computing device 120 may await a second (or third, fourth, etc.) signal that is relevant to the first signal (or one or more prior signals if more than one) and allows for a more informed or more targeted recommendation. Continuing with the above example, if the user computing device 120 detects "I need to manage her finances," application 250 may determine there is a potential financial issue (based on, e.g., keywords or phrases such as "larger home" and "move in") but may also determine that more information is desirable for formulating a suitable recommendation. Such information may, in some implementations, be acquired via dialogue with the customer (e.g., an inquiry, conversation, or other information exchange). For example, chatbot 270 of application 250 (running on, e.g., a consumer computing device 120) may speak with the customer to ask general questions (e.g., inquiring whether the customer would like assistance with a major purchase, followed by more specific questions) and/or specific questions (e.g., inquiring about the features of the item to be purchased, such as style of car, number of bedrooms, etc.).

In certain implementations, when the second, third, or other signal is detected, the provider computing device 110 and/or user computing device 120 may access the fragmented issue indicators 615 for related information. Based on, for example, the first signal (e.g., related to a need to look after the mother), application 250 may predict that the current home of the customer is not large enough or does not have a suitable bedroom available and await one or more additional related signals concerning, for example, the size or features of homes and discussions about open houses. In some implementations, location may be tracked in response to a prediction that, for example, open houses or car dealerships may be visited. The robo-advisor (via, e.g., provider computing device 110 and/or user computing device 120) may then be more informed about the types of signals to look for (e.g., visiting open houses or discussions about the adequacy of the current home), provide more informed recommendations, or ask more informed questions as part of a dialogue with the customer. Alternatively or additionally, the second signal may be recorded as another fragmented issue indicator 615 for subsequent use (e.g., in combination with a third signal detected subsequently).

In some implementations, the fragmented issue indicators 615 may be made available to an advisor computing device 130 prior to or during a human advising session. Such fragmented issue indicators 615, or certain fields therein, may be recorded using, for example, "plain" text or other format that is readily interpretable by a financial advisor to help make the transition from robo-advisor to human advisor more efficient by helping the advisor more quickly understand the customer's circumstances (and consequent needs and goals). In some implementations, the user profile 600 may record encoded versions of the signals as fragmented issue indicators 615, and the decoding scheme may be made accessible to specified advisor computing devices 130 or other devices to help control what information is shared (to save time that might otherwise be spent reviewing information that is not particularly relevant to a topic to be discussed during an advising session, to better maintain confidentiality of certain information, etc.).

This approach assists with implementation of pervasive advising, as a more complete picture can be formed even though computing devices 200 may only detect or acquire part of the picture (e.g., aspects of a customer's circumstances) in a given time period. Multiple segments of a discussion, user entries, etc., in multiple contexts, may be needed or desired to enhance understanding of relevant financial issues and thus enhance the likely value and relevance of resulting recommendations. Advantageously, user computing devices 120 being used to detect conversations may not always detect a conversation in its entirety, or even if a whole conversation is detected, not all of the words and meanings may have been understood. For example, if the user computing device 120 detecting a conversation is a smartphone, and the smartphone is placed in a pocket or bag during a conversation, the voices may become muffled, and the portion of the conversation during which the smartphone is in the pocket or bag may be missed. Similarly, if the user computing device 120 is a smart speaker in one room, and one or more speakers move out of the room or otherwise out of the range of the smart speaker, portions of the conversation may be missed. By combining fragmented issue indicators 615, a customer's needs can be evaluated and identified over time as additional user inputs are detected.

Example profiles 600 may also include one or more fields related to exclusions and deferments 620. These fields may indicate, for example, that a customer does desire or need assistance with certain matters (exclusion of a matter), or may not desire or need assistance for a certain specified time period (deferment of matters). In some implementations, application 250 may refer to exclusions and deferments 620 before a recommendation is formulated or given. For example, conversationalists (via spoken words, written communications, etc.) may make certain statements in certain contexts that are not, taken in isolation, valuable predictors of a user's goals or needs. For example, a speaker may make a statement with a friend for the purpose of making a point, in jest, sarcastically, to be agreeable, and/or to spare feelings. In a hypothetical, if a friend informs a customer that the friend is traveling to a European city, and the customer states in response that the customer has wanted to visit that European city for a long time, the customer does not necessarily need help with the financial goal of saving for a vacation. The customer may, for example, be thinking that he or she would like to visit the city years in the future, and/or has already established and is making progress towards the goal (as can be confirmed by application 250 accessing the customer's accounts, prior advising sessions, other communications, etc.), and consequently, the customer may not need to immediately address or revisit the issue. In some implementations, such a statement may be deemed to warrant an entry in exclusions and deferments 620 of the customer's profile to help limit or avoid recommendations on certain topics. Similarly, an exclusion and deferment 620 may be generated in response to a specific instruction or statement of a customer (e.g., a customer stating to a consumer computing device 120 directly or making a statement to another person such as "I do not want to be advised on this topic" or "that's not a priority of mine right now, I will deal with that next month/year"). In some implementations, the information on particular topics may still be saved to help form a better picture of a customer's circumstances, but recommendations may be modified to avoid or delay certain topics.

Alternatively or additionally, certain statements may be analyzed to generate entries in goals and progress 625 of profile 600. For example, continuing with the above example, the customer saying that he or she wants to visit the city in Europe may indicate that, for example, the customer likes to travel (if not already known or determined in another way) and/or that the customer may now be considering a vacation. Such information, recorded in profile 600, may then be used by the robo-advisor, and/or presented to an advisor, to better inform recommendations and proposals.

Profile 600 may also include one or more session parameters 630. Application 250 (via, e.g., consumer computing device 120) may accept session parameters 630 (via, e.g., dashboard 510) to determine how a human advising session should be conducted. For example, a customer may wish to have audio only, text only, or video chat. The session parameters may be used by provider computing device 110, user computing device 120, and/or advisor computing device 130 to provide the customer with human advising sessions that meet the customer's needs.

Additionally, a customer may only wish to receive automated recommendations in specified ways, something that can be indicated in robo-advising parameters 635 of profile 600. In some implementations, the consumer computing device 120 may be programmed to only speak or otherwise make inquiries and provide recommendations under certain conditions but not under other conditions based on robo-advising parameters 635. For example, if a user is speaking with a casual friend, it may not be appropriate to converse with the user to inquire as to whether the user wishes to pursue a specified (personal/confidential) financial goal (such as buying a new car) that is identified based on the conversation with the casual friend. Rather, the user may wish to receive recommendations when the user is alone, at home, with close family or friends only, during certain times and days (e.g., not during work hours, or not after dinner when the user may be winding down for sleep and not wishing to consider financial issues, or not on Sundays), and via certain channels and formats. In some implementations, robo-advising parameters 635 may, for example, prohibit a smart speaker or other consumer computing device 120 from disrupting the customer or discussing confidential topics at inappropriate times.

Profile 600 may also include human advising parameters 640. In some implementations, human advising parameters 640 may indicate that a customer wishes only to receive high-level advice on overall goals from human advisors (e.g., to discuss the "big picture," such as the prudence and suitable timing for buying a new car). Similarly, the human advising parameters 640 may indicate that the customer is additionally or alternatively interested in more specific advice on implementing particular goals or executing on action plans (e.g., amounts to save, anticipated monthly payments, etc.). In certain implementations, the fields/values of human advising parameters 640 may be used by provider computing device 110 and/or customer computing device 120 when matching a customer with a suitable human advisor.

Profile 600 may additionally or alternatively include one or more acquisition parameters 645. In one or more fields, acquisition parameters 645 may specify how the customer is to be surveilled (e.g., what inputs may be acquired, how various inputs are captured, etc.) and when/where the customer is not to be surveilled. In some implementations, acquisition parameter 645 may indicate which consumer computing devices 120 may be used to detect conversations. For example, a customer may wish to include/exclude detection of conversations via identified smartphones, smart speakers, smart watches, laptops, etc., to control in what circumstances the customer's words may be taken into consideration (e.g., should or should not be used as a source of data for advising purposes). Consumer computing devices 120 may be identified by, for example, device identification numbers and/or associated users. In various implementations, acquisition parameter 645 may, alternatively or additionally, identify certain locations (as determined using, e.g., location sensor 235) which are "off limits" and conversations should not be surveilled. For example, a customer may identify a doctor's office as a location, and in response to detection that the consumer computing device 120 is located in, or has moved into, the identified location, the consumer computing device 120 may cease detection of conversations for use in advising the customer. This would allow the customer to exclude certain private conversations (with, e.g., a therapist) from consideration in advising. In some implementations, acquisition parameters 645 may be used to indicate that conversations with certain persons are included/excluded as advising inputs, and/or certain modes of communication are included/excluded as advising inputs. With such acquisition parameters 645, a consumer computing device 120 may, for example, not continue detecting a conversation in response to identification of a specified speaker (by, e.g., recognizing a voice signature, detecting the person's name used in a greeting, etc.), and/or may include exclude certain electronic messages (e.g., text messages and/or e-mails) received from specified applications and/or communication channels from being analyzed for inputs relevant to advising of the customer.

Parameters and fields corresponding to profile 600 identified in FIG. 6 help both the robo-advisor and the human advisor provide more relevant recommendations in a personalized fashion, while more quickly focusing on the topics on which a customer wishes to receive assistance. They also help customers more seamlessly transition between robo-advising and human advising, allowing the more efficient form of advising to be used based on customers' circumstances.

Referring to FIG. 7, an example overview of a set of goals associated with a hypothetical customer is depicted. The first column indicates what major expenditure is desired/needed. In this example, the customer has four goals, each goal having a different timeline depending on the needs of the customer. For example, the customer may wish to travel to Europe within a year, buy a new car within 6 months, purchase a wedding ring as soon as a ring is selected, and purchase a new home within two years. The second column indicates how much the customer could afford to spend and/or how much of a loan the customer would be approved for if the provider were to underwrite a loan for the expenditure now. The affordability amount and interest rate may be based at least in part on what the customer could afford based on his or her financial circumstances.

In some implementations, the affordability fields may also include a prediction of how much could be afforded if the customer where to defer making the purchase, or how much of a loan may be underwritten at some time in the future (and, potentially, at what interest rate) if the customer were to wait for a certain time and stay on track with financial goals (e.g., budgets, savings, debt management, etc.). The amount of time may be the same for each goal (e.g., 3 months, 6 months, 1 year), may be different based on the type of goal (e.g., larger expenditures might have a longer timeline), or may be customized by the customer and/or an advisor based on the customer's goals, financial circumstances, and advisor (robo or human) recommendations. In the example depicted in FIG. 7, for each case, the customer could be approved for a greater amount and at a better interest rate in the future. This may be based on various assumptions and on a requirement that the customer takes certain actions. For example, the higher amount and/or lower interest rate may be based on such assumptions as: the customer having more funds saved; a track record of staying within designated budgets; rising value of assets (e.g., rise in value of a home or investments); the customer continuing to make on-time and additional (i.e., above minimum) payments for all debts and thereby enhancing his or her internal score (and/or external credit score); etc. The future anticipated amount may also be based on macroeconomic factors, such as interest rates going up or down or staying about the same as expected.

In the third column, FIG. 7 provides example recommendations for how to achieve a goal and/or when to make a purchase. These may be based on robo advising (implemented using, e.g., provider computing device 110) and/or on human advising (received, e.g., via advisor computing device 130). Such recommendations may be based on the financial circumstances of the customer, on realistic steps that could be taken by the customer to improve his or her financial situation, and/or on external factors that are independent of the customer. For example, the provider computing device 110 may access various third party computing devices 140 to determine that fuel costs are coming down, which might be expected to result in lower fares and impact what the customer could afford. Similarly, the provider computing device 110 and/or consumer computing device 120 may determine that car inventories are predicted to go up or down, that the cost of precious metals is changing, that home mortgage interest rates are changing, and/or that home values are going up where the customer resides and/or where the customer wishes to purchase a home. In some implementations, the recommendations may, at least in part, be based on human advising received via advisor computing device 130.

The provider computing device 110 and/or consumer computing device may also access (e.g., using various third-party APIs) various sources of information to identify different suitable options for the type of major expenditure. For example, the provider computing device 110 may access one or more third party computing devices 140 of various travel sites (such as Expedia, Travelocity, Kayak, etc.) to determine various flight and lodging options for travel, of dealer websites to determine various car options suited to the needs of the customer, of merchant websites to determine various ring options, and/or of various realty sources to determine home options. In various implementations, for each goal, the provider computing system 110 and/or consumer computing device 120 may retrieve data on various purchases via, for example, external resource module 295. For example, for the goal of traveling to Europe, the provider computing system 110 and/or consumer computing device 120 may determine that there are two flight options (Flight 1 and Flight 2 by accessing API services provided by Travel Sites 1 and 2) that have different costs (e.g., $800 and $620). The options presented may be determined to be suitable for the customer based on the needs and desires of the customer as ascertained via application 250 running on the consumer computing device 120. In some implementations, the options may be provided even if they are expected to change by the time the customer is ready to make the purchase in order to keep the customer more informed (about, e.g., how much money he or she may need for the major expenditure or what the customer could afford to purchase).

Such an overview (or a subset of the data represented therein) may be updated in response to actions taken by the customer. In some implementations, the data may be made accessible at any time via an application 250 running on a consumer computing device 120. The consumer computing device 120 could be used, for example, to view changes to the approval amounts and rates on, for example, a daily or hourly basis. In various implementations, the data is updated shortly after each relevant action or change in circumstances detectable by the provider computing device 110 (e.g., opening accounts and/or making payments via the consumer computing device 120). In some implementations, the approval amount and interest rate may be updated based on factors independent of the customer (such as changes in interest rates, inclement weather, world events, etc.) which could be determined, for example, by the provider computing device 110 by accessing a third party computing device 140.

It is noted that any of the icons or screen elements in the figures can be structured to be clickable or otherwise selectable (using any input mechanism, such as a touchscreen, mouse, voice prompt, gesture, etc.) for accessing additional information (such as details about a goal, underwriting, account, expenditure, available options, etc.), and/or for making authorized changes (such as changing goal parameters, adding or moving funds needed for an identified goal, etc.).

Referring to FIG. 8, an example graphical user interface of, for example, a potential dashboard 310 is illustrated. The user interface, which may be viewable via consumer computing device 120 and/or advisor computing device 130, simultaneously or at different times, provides information on financial goals. The issues may have been identified and refined via robo-advising, human advising, or both. Also identified in the example user interface are accounts held by, or otherwise accessible to or viewable by, the customer. These accounts may be used in the fulfilment of financial goals, such as by having provider computing device 110 and/or customer computing device 120 transfer funds to/from such accounts or control spending by using credit accounts with particular limits, for certain expenses, etc.

The user interface may also identify advisors which whom the customer has conferred. In various implementations (not shown in FIG. 8), the interface may also identify, for example, the topics discussed with each advisor, the availability of each advisor, or the recommendations of each advisor. Also identified in FIG. 8 are the family members of the customer. Alternatively or additionally, members of one or more authentication circles (which does not necessarily require a familial relationship) to which the customer belongs may be identified. If authorization is obtained from the family members, even if they are not customers or otherwise being separately advised, conversations or other inputs of the family members may be used to better understand the goals and needs of the customer and thereby enhance the quality of recommendations and transitions between robo-advising and human advising. In some implementations, only conversations of (selectable) members of one or more (selectable) authentication circles may be used, as those members may be deemed to be stakeholders with respect to one or more issues/expenses. Some or all of the information in dashboard 510 may be stored or identified in profile 600. For example, fragmented issue indicators 615 for all of the known family members/authentication circle members may be included in profile 600.

Figure 9:
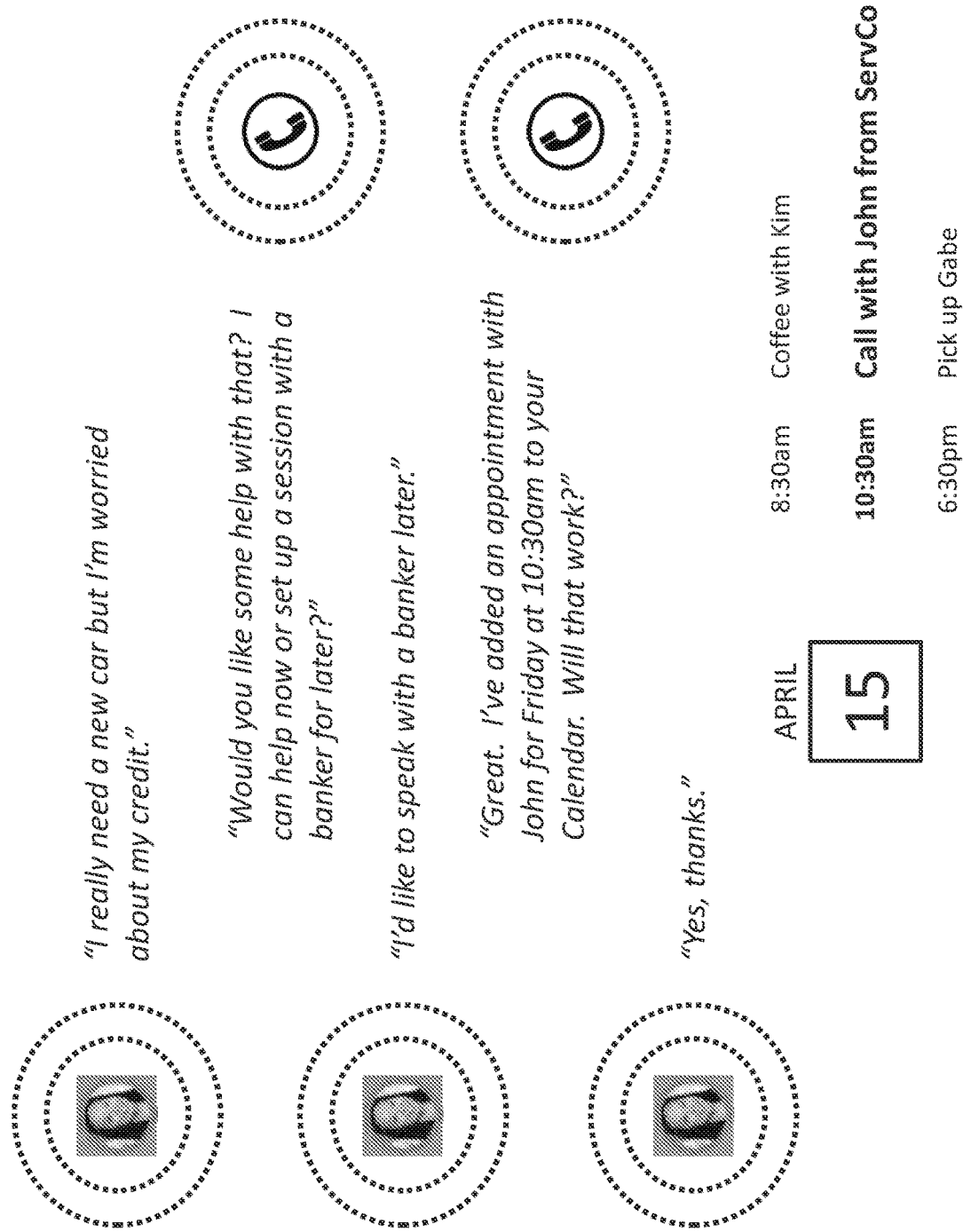
FIG. 9 depicts an example communication between a consumer device and a provider computing device according to example embodiments.

With reference to FIG. 9, which depicts an example communication between a consumer computing device 120 and a provider computing device 110 or an advisor computing device 130, in some examples, a person (e.g., a customer) may have difficulty keeping track of his or her finances and managing his or her credit. The person may be expecting to grow his or her family and wish to get his or her finances under control in order to meet a financial goal of, for example, purchasing a new vehicle in anticipation of having a larger family. In some examples, based on recent transaction history indicating the possibility of a new baby and/or a transaction such as a newly established college fund, the provider computing device 110 may pervasively inquire, via a consumer computing device 120 (e.g., a proactive listing bot), whether the person would like some help with meeting a financial goal. The financial goal may include buying a new car, traveling before a new baby arrives (e.g., a "baby moon"), etc. The consumer device 120 may listen and interpret the voice input of the person that indicates a desire to meet a financial goal. In some examples, the provider computing device 110 may pervasively inquire, via a consumer computing device 120, whether the person would like to set up a virtual meeting (e.g., a session or an appointment) with one or more bankers or other advisors to discuss the financial goals of the person. In some implementations, the virtual meeting may additionally include one or more family members, members of an authentication circle, etc. After the customer confirms that he or she is interested in a session with an advisor, the provider computing device 110 may generate a command structured to add the virtual meeting to one or more calendars accessible to one or more consumer computing devices 120 associated with the customer (and any others who may be joining the session) and/or a calendar accessible to one or more advisor computing devices 130 of one or more advisors, as shown by the calendar and/or schedule icon ("April 15") in FIG. 9.

In some embodiments, the provider computing device 110 may be part of the computing system of a financial institution. Generally, the financial institution provides financial services (e.g., demand deposit accounts, credit accounts, etc.) to a plurality of customers. The financial institution provides banking services to the customers, for example, so that customers can deposit funds into accounts, withdraw funds from accounts, transfer funds between accounts, view account balances, and the like via one or more provider computing devices 110.

Figure 10:
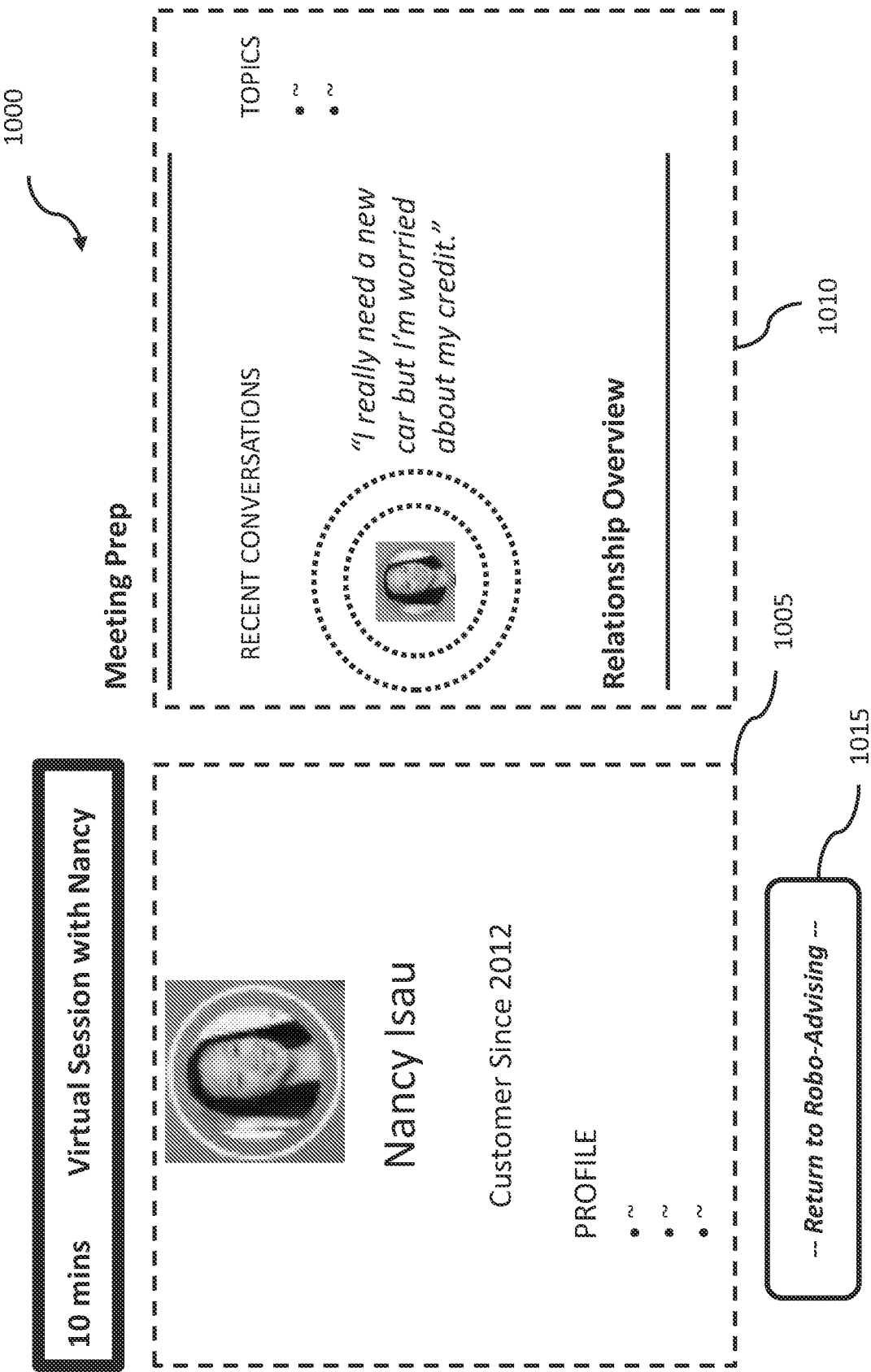
FIG. 10 depicts an example graphical user interface of a potential virtual dashboard according to example embodiments.

FIG. 10 depicts an example graphical user interface of a potential dashboard 510 structured to provide robo or human advising according to example embodiments. The consumer computing device 120 may output, via the graphical user interface, a user profile 1005 associated with the user based on, for example, transaction or account data. The user profile 1005 may identify the user and provide relevant information pertaining to the user (e.g., user name "Nancy Isau," customer status "Customer Since 2012," etc.). In some examples, the graphical user interface may include or otherwise display data and interactions (e.g., conversations, transactions, and/or other relevant data) as represented by icons and/or graphics 1010 that have been compiled by the provider computing device 110 and/or consumer computing device 120 for that user (e.g., the customer's photograph). This may allow a human advisor to seamlessly start the session with one or more users (jointly or in succession) where the consumer computing devices 120 and advisor computing devices 130 ended a prior conversation/engagement. In some versions, members of an authentication circle (or subsets thereof) may seamlessly engage in one or more sessions jointly or in succession. The dashboard 510 may also provide a "Return to Robo-Advising" selection 1015 to end the session and return the customer to robo-advising. In some implementations, this selection only becomes available when "back to bot" triggers are detected.

Figure 11:
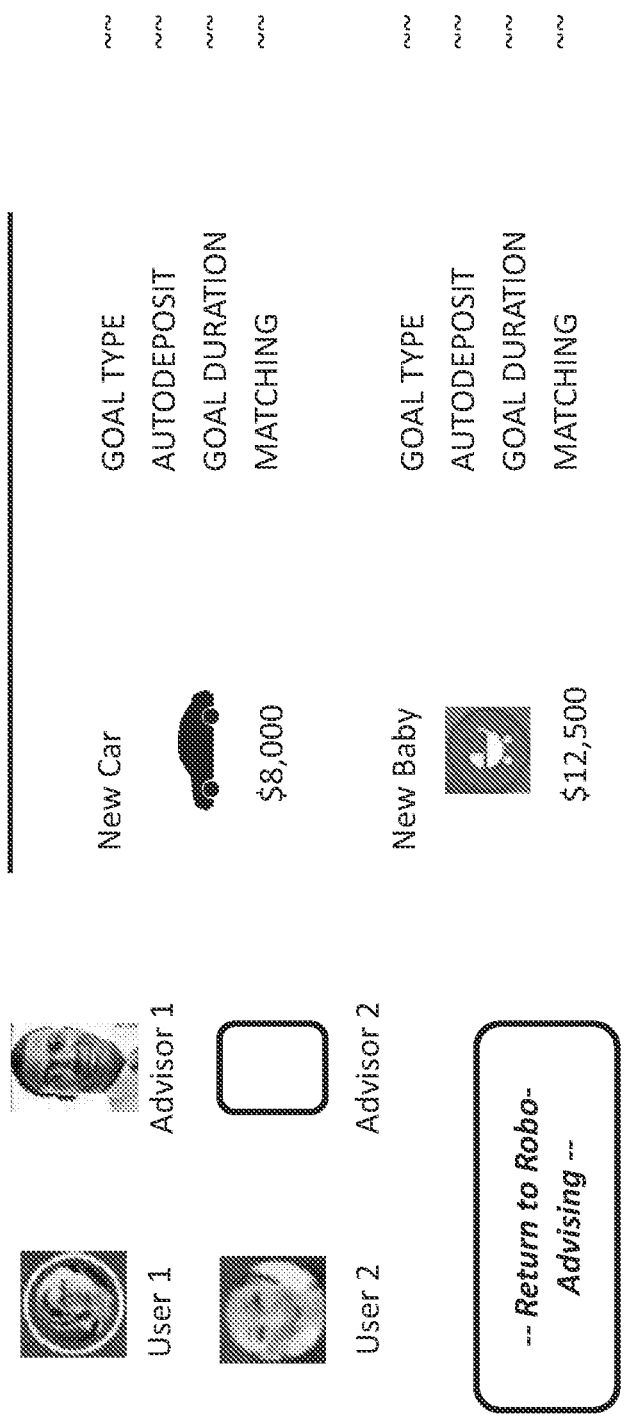
FIG. 11 depicts an example graphical user interface of a potential virtual dashboard according to example embodiments.

FIG. 11 depicts an example graphical user interface of a dashboard 510 according to example embodiments. The provider computing device 110 and/or consumer computing device 120 may be structured to generate an expense strategy according to a time period (e.g., a timeline, one or more minutes, hours, days, years, etc.). During the session (e.g., the virtual robo-advising session with provider computing device 110 or human advising session with advisor computing device 130), the advisor may develop an expense strategy that may be implemented over a certain period of time based on one or more financial goals. The expense strategy may include one or more icons and graphics structured to represent, for example, a "5 Year Timeline" and/or financial goals of the user. In some arrangements, the graphical user interface may include an image and/or video of an advisor, or audio of the voice of an advisor. The image, video, and/or the audio of the advisor may be provided in real-time or near real-time such that the user may view or otherwise engage with the advisor live. In various implementations, multiple advisees and/or multiple advisors may interact live via dashboard 510. In some implementations, an advisor (e.g., "Advisor 2") may be a robo-advisor helping one or more human advisors (e.g., "Advisor 1") advise or otherwise assist one or more users (e.g., Users 1 and 2).

Figure 12:
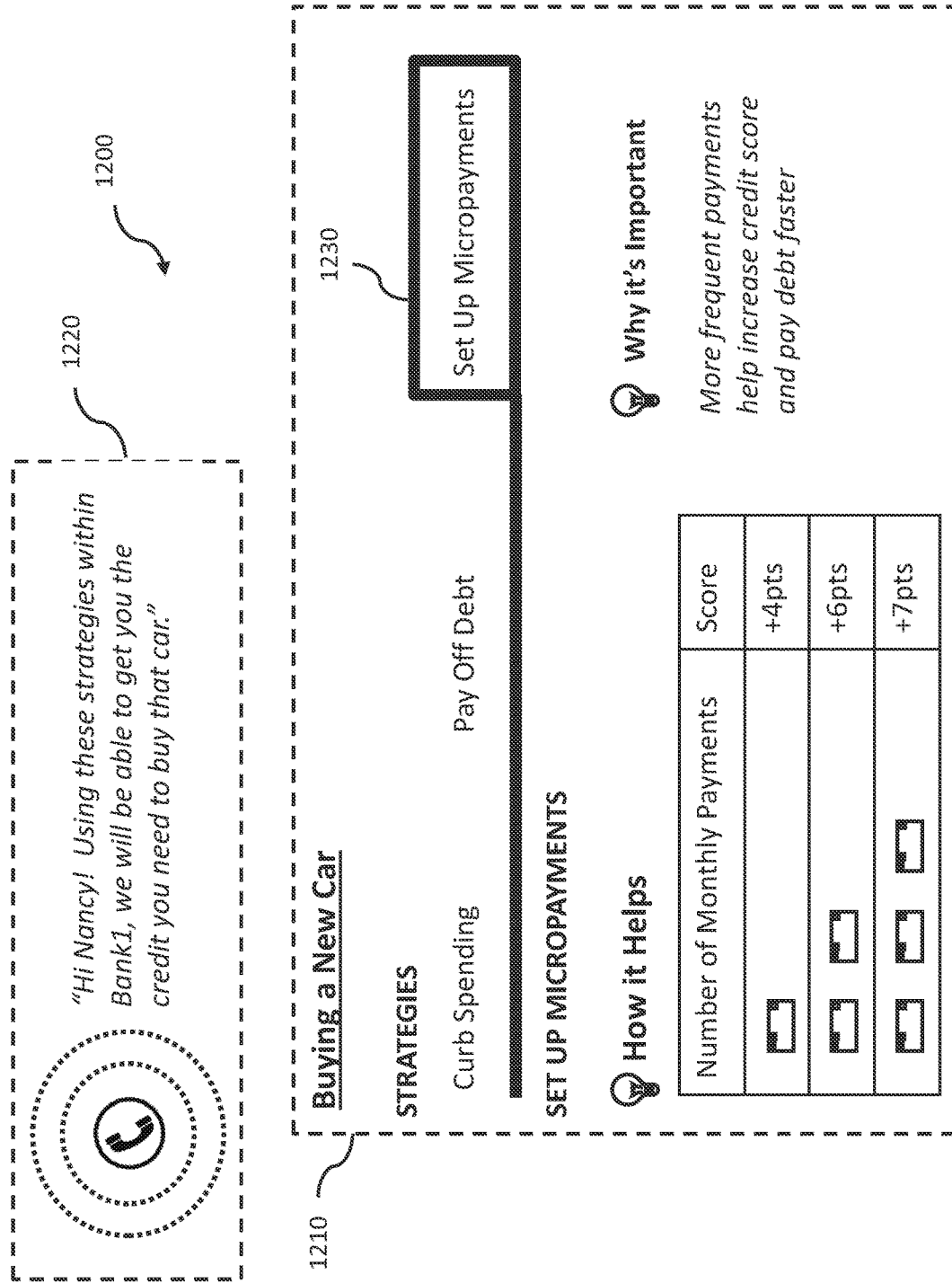
FIG. 12 depicts an example graphical user interface of a potential virtual dashboard according to example embodiments.

FIG. 12 depicts an example graphical user interface 1200 of a major expenditure advising system 100 according to example embodiments. In some implementations, the data is maintained at provider computing device 110. In various implementations, the graphical user interface is part of a dashboard that is accessible via application 250 running on one or more consumer computing devices 120 (such as computing devices of members of an authentication circle). In certain implementations, the dashboard is also accessible via advisor computing device 130 if, for example, the customer computing device 120 and the advisor computing device 130 are engaged in an advising session (e.g., a video chat, audio chat, and/or text chat). Such a graphical user interface may be used to present an expense strategy 1210 customized for the customer (via, e.g., robo advising and/or human advising) to help the customer achieve the goal of making a major purchase (e.g., buying a new car). As depicted by icon 1220, the consumer computing device 120 may speak, or output the speech, conversation, voice, etc. of the human (or robo) advisor during a session. For example, the advisor may suggest that the customer make micropayments on each credit card by setting up auto-pay (weekly, bi-weekly, monthly, etc.) for each credit card to increase the amount of payments that the user makes on time. In turn, the internal credit score of that customer may increase more quickly (as indicated by the +4, +6, and +7 pts corresponding with increases of 4, 6, and 7 points if one, two, or three monthly micropayments are made by the customer, respectively). In some examples, an expense strategy 610 may be displayed with a proposed change in spending, debt payoff, micropayments, etc. The expense strategy may be represented or further detailed by one or more tabs 1230. For example, the consumer computing device 120 may be used to switch from the "Set Up Micropayments" to the "Curb Spending" or "Pay Off Debt" tabs. The tabs 1230 may be structured to display the expense strategy details dynamically responsive to a user clicking or selecting a tab.

Figure 13:
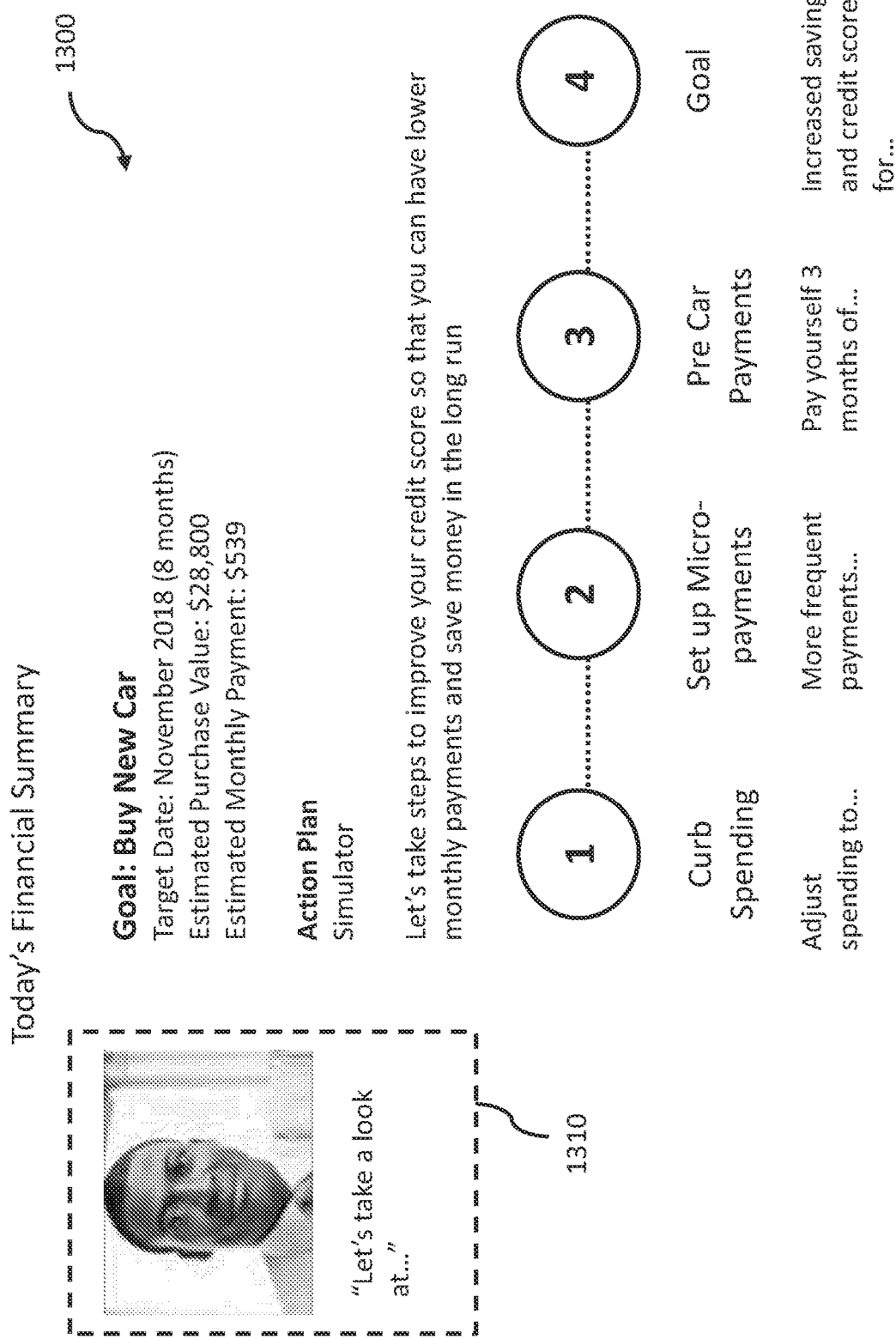
FIG. 13 depicts an example graphical user interface of a potential virtual dashboard accessible according to example embodiments.

FIG. 13 depicts an example graphical user interface 1300 of a potential dashboard 510 according to example embodiments. In some examples, the consumer computing device 120 and/or the advisor computing device 130 may output the graphical user interface 1300. The graphical user interface 1300 may represent a digital dashboard with icons, images, data, charts, other graphics, etc., that may represent a financial goal, action plan, goal progress, etc. In some arrangements, the graphical user interface 1300 may include an image and/or video 1310 representative of an advisor, or audio of the voice of an advisor (and/or a transcription of words spoken by the advisor). The image, video 1310, and/or the audio of the voice of the advisor may be provided in real-time or near real-time such that the user may view or otherwise engage with the advisor live.

Figure 14:
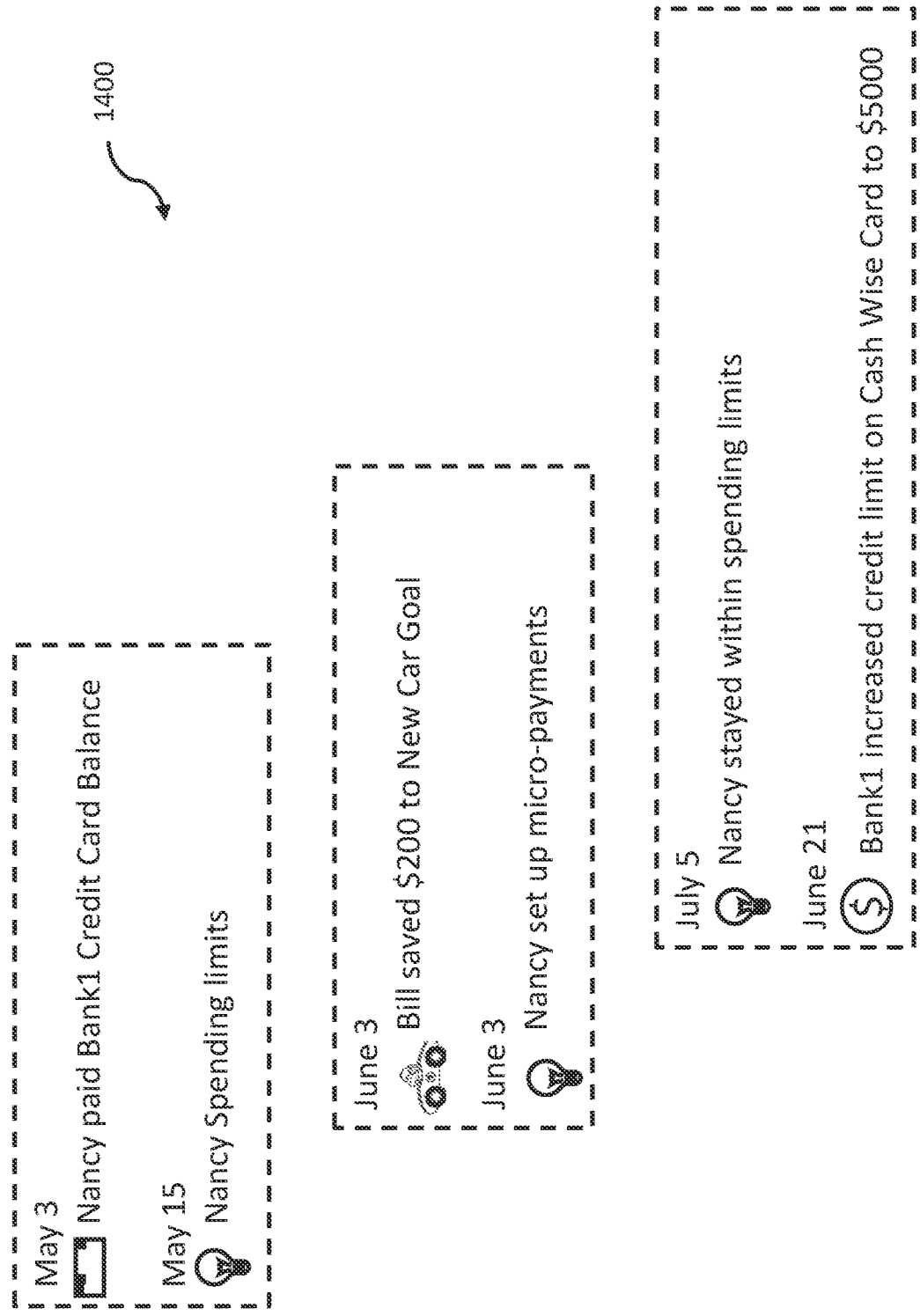
FIG. 14 depicts example notifications for pervasive advising according to example embodiments.

Illustrated in FIG. 14 are example expense strategy notifications (e.g., messages, notices, account updates, invitations, offers, etc.). In some implementations, the provider computing system 110 may provide, send, or otherwise transmit an expense strategy notification to consumer computing device 120 associated with the customer based on detection of a certain transaction or other action or event. The expense strategy notification may be output or otherwise displayed via a user interface 200 (e.g., via a display, speaker, other audio/visual components of the consumer computing device 120). The expense strategy notification may indicate or otherwise inform the user of an action that affects the financial goal of the user as depicted in the graphical user interface 1400. As shown in FIG. 14, the expense strategy notification may output/indicate when the user took an action that affects the expense strategy. For example, the expense strategy notification may include a time stamp, date stamp ("May 3 Nancy paid . . .," "May 15 Nancy set spending limits," etc.), or other indications of when an action occurred. The expense strategy notification may include a financial goal status based on the action or a plurality of actions taken by the user that affect the expense strategy. In some examples, the provider computing device 110 may transmit an expense strategy notification to the consumer computing device 120 and/or advisor computing device 130 to inform the customer and/or advisor of the amount that the customer can afford to spend or save based on the financial situation of the customer. As shown, the expense strategy notification may include actions from a single user or a plurality of users (e.g., "Bill saved $200 to New Car Goal", "Nancy set up micro-payments," etc.). Advantageously, users may find the expense strategy notification as motivational and helpful to improve their financial status and to reach their financial goals (e.g., the goal to purchase a new car).

Figure 15A:
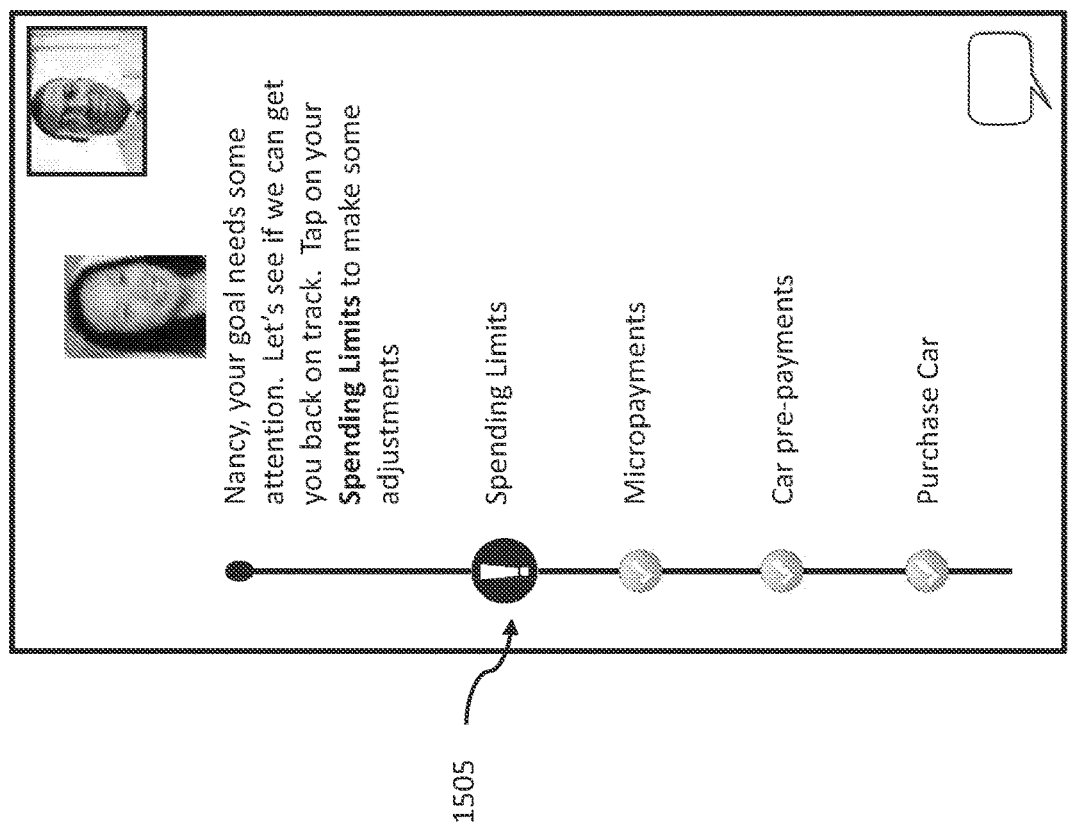
FIG. 15A depicts an example graphical user interface for a possible interaction between a customer and advisor according to example embodiments.

FIG. 15A depicts an example graphical user interface of an example dashboard 510. The illustrated exchange may be between the customer computing device 120 and the advisor computing device 130 (as part of a human advising session), and/or the exchange may be between the consumer computing device 120 and the provider computing device 110 (as part of a robo-advising session). According to an example embodiment, the consumer computing device 120 may present the expense strategy (e.g., advice, suggestions, etc.), which may have been, for example, generated by the provider computing device 110 and/or updated via an advisor computing device 130, to the customer to help the customer review, maintain, or improve progress towards a financial goal. The graphical user interface may be displayed such that the expense strategy may include icons indicative of a goal status (e.g., checkmarks for completed or accomplished, and exclamation points for incomplete or otherwise requiring attention or response). In some implementations, icons presented along a line may indicate an order or timeline for the goals (e.g., one goal may build on a preceding goal or may otherwise follow another goal temporally). The icons may correspond to one or more strategies such as, but not limited to, spending limits, micropayments, car pre-payments, car purchase, etc. In some examples, the icons may indicate whether the customer is off track or on track toward reaching the financial goal. For example, icon 1505 indicates that the customer is off-track with maintaining spending limits toward the goal of purchasing a new car. In some examples, the graphical user interface may allow the user to drill down to receive more detail. For example, a customer may click (or otherwise select) icon 1505 and/or provide a voice command to see more information about how the customer may get back on track toward meeting the financial goal.

Figure 15B:
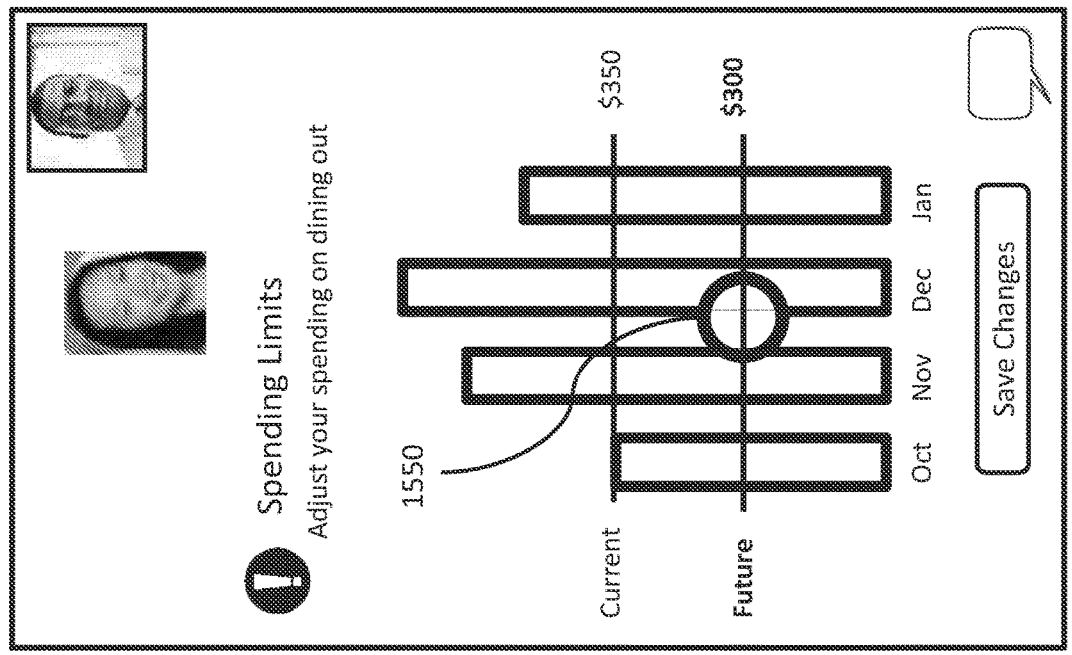
FIG. 15B depicts an example graphical user interface for a possible interaction between a customer and advisor according to example embodiments.

In some examples, if a customer selects one of the identified goals in FIG. 15A, another graphical user interface, such as the one depicted in FIG. 15B, may be presented. The graphical user interface may include icons/graphics that represent, for example, the spending limits of a customer. The graphical user interface may include an adjuster icon 1550 (e.g., a graphical dial, slider control, etc.) structured to allow the customer (or advisor) to adjust/control, via dashboard 510, various values (such as spending limits) as desired by the user. For example, the icon 1550 may be adjusted up, down, left, right, or in any other direction/position via the customer computing device 120 and/or advisor computing device 130. In some examples, the icon 1550 may represent a spending limit that is adjustable via the provider computing device 110 (as part of robo-advising) or the advisor computing device 130 (as part of human advising). Responsive to the adjustment of the icon 1550, the spending limits of the user may then represent whether the user is off-track or on-track toward reaching the financial goal. The provider computing device 110, consumer computing device 120, and/or advisor computing device 130 may update profile 600 (e.g., by entering, updating, or revising values in fields corresponding to the goals and progress 625 parameter). In some arrangements, the graphical user interface may include an image and/or video representative of an advisor (e.g., at the top right in FIG. 15A) and/or audio of the voice of an advisor in real-time or near real-time such that the user may view or otherwise engage with the advisor live. The graphical user interface may include a selection (e.g., the virtual "Save Changes" button) to allow the customer or advisor to save adjustments to the expense strategy, spending limits, etc.

Figure 15C:
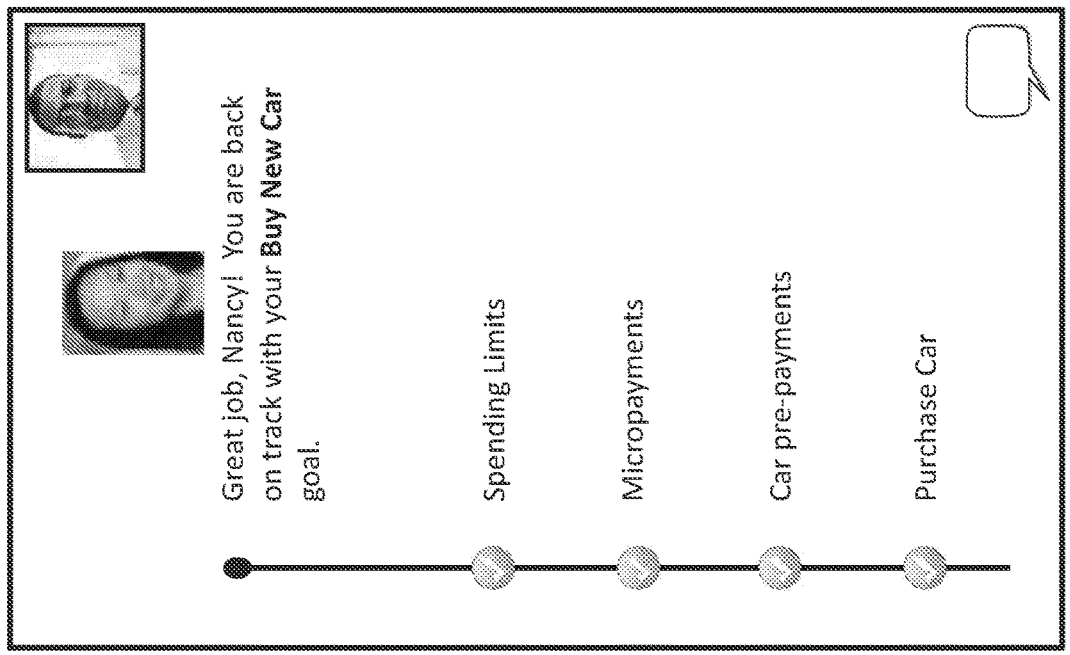
FIG. 15C depicts an example graphical user interface for a possible interaction between a customer and advisor according to example embodiments.

FIG. 15C depicts an example graphical user interface of an potential dashboard 510 according to example embodiments. In various implementations, the provider computing device 110 may present the graphical user interface depicted in FIG. 15C to the customer via the consumer computing device 120 and/or to the advisor via advisor computing device 130. In some examples, the graphical user interface may be presented to the user in response to the user clicking an icon or button and/or providing a voice command as described herein. The graphical user interface may include a notification, message, and/or update that includes the current status of the user toward meeting a financial goal. As depicted in FIG. 15C, the checkmark icon (formerly an exclamation point) adjacent to "Spending Limits" may indicate the customer is back on track based on, for example, the limits, transactions, adjustments made (via, e.g., the graphical user interface of FIG. 15B), or other actions of the customer.

Figure 16:
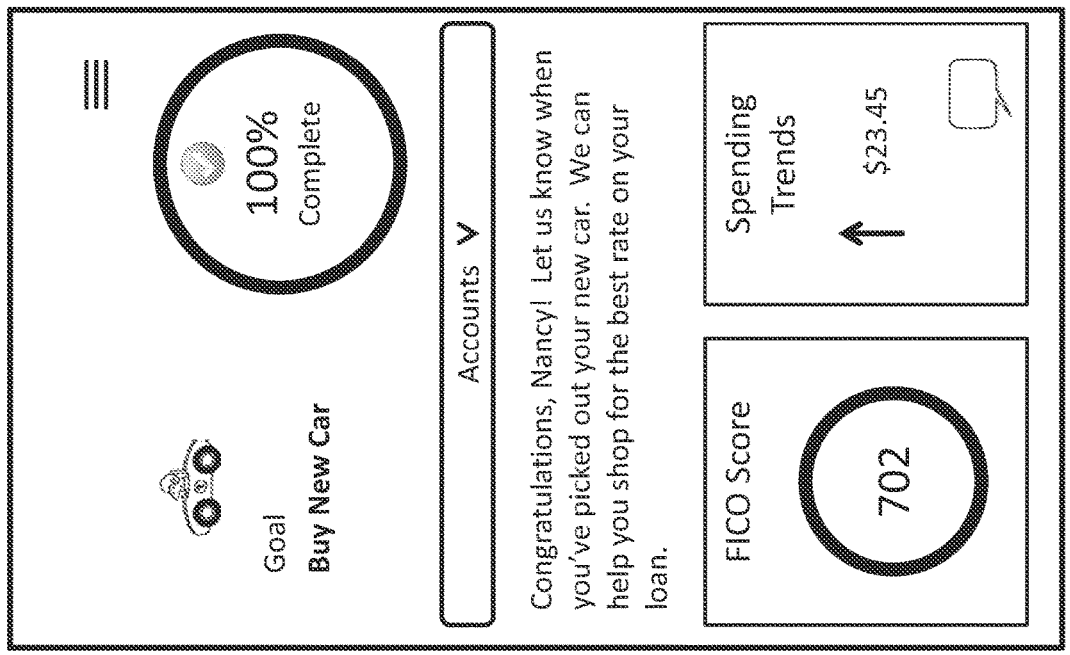
FIG. 16 depicts an example graphical user interface for a potential virtual dashboard accessible customers and/or advisors according to example embodiments.

FIG. 16 depicts an example graphical user interface of an potential dashboard 510. According to an example embodiment, the provider computing device 110 may present the graphical user interface to the customer and/or advisor via the consumer computing device 120 and/or the advisor computing device 130. In some examples, the graphical user interface may represent a digital dashboard that includes icons, images, data, charts (e.g., the graphical charts/graphs), other graphics, etc., that may represent the credit score, spending trends, status of the customer toward reaching the financial goal, etc. According to the current example depicted in FIG. 16, the customer has made 100% progress toward the financial goal of buying a new car. The content of the digital dashboard may be provided in real-time or near real-time by the provider computing device 110. Advantageously, the customer may be informed of the current status of reaching the financial goal based on the real-time or near real-time update of the digital dashboard 510.

Figure 17:
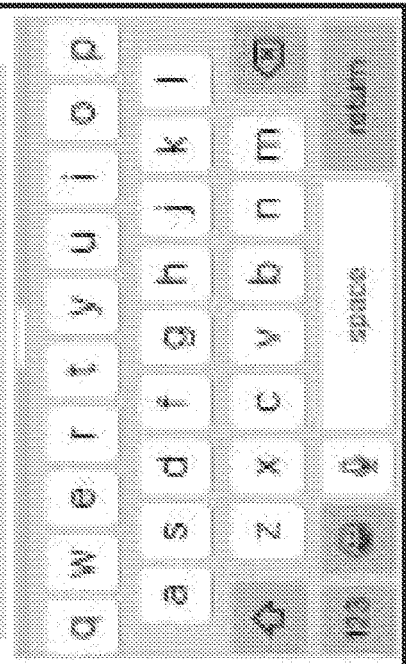
FIG. 17 depicts an example graphical user interface for an interaction between a customer and advisor according to example embodiments.

FIG. 17 is an example graphical user interface of a potential dashboard 510 according to an example embodiment. In some examples, the provider computing device 110 is structured to generate an expense strategy notification (e.g., a message, SMS, notice, account update, invitation, offer, etc.). The provider computing device 110 may provide, send, or otherwise transmit the expense strategy notification to a consumer computing device 120 and/or advisor computing device 130. The expense strategy notification may be output or otherwise presented via a display, speaker, other audio/visual components of the consumer computing device 120 and/or the advisor computing device 130. For example, the expense strategy notification may include an offer for an auto loan transmitted to the consumer computing device 120 of the customer when the customer meets the financial goal as identified by the provider computing device 110 and/or advisor computing device 130. In some implementations, an expense strategy notification that includes an offer may be transmitted to the consumer computing device 120 in response to the consumer computing device 120 transmitting an expense strategy notification (e.g., a SMS that includes information that the customer is ready to buy the car, a home, etc.) to the provider computing device 110 and/or the advisor computing device 130.

As discussed above, a customer may be proximate to a location corresponding with a transaction point for a major purchase (e.g., a customer may drive or walk by a car dealership). While at or near the location, the customer may think about a new car that he or she wants to purchase. As the customer passes the car dealership, the consumer computing device 120 may determine that the customer is at or near the car dealership. In some examples, while at or near the location, the customer may receive an expense strategy notification (e.g., a geo-located notification) from the provider computing device 110 that the customer is approved for a loan (e.g., a car loan). The provider computing device 110 may recommend the expense strategy based on the transactions, current budget, and spending patterns of the customer. The expense strategy may include a recommendation to the customer that includes the payment amount (e.g., a monthly payment amount) that the customer can safely afford.

The location monitor 265 may determine (e.g., via GPS coordinates and/or cellular network triangulation data acquired via location sensors 235) the location of the user associated with the consumer computing device 120. In such examples, the consumer computing device 120 may be approaching (e.g., as the customer is walking, driving, riding, running towards, etc.) or visiting the car dealership. In some implementations, the consumer computing device 120 may transmit location data to the provider computing device 110.

While the consumer computing device 120 is at or near the car dealership, the provider computing system 110 may generate an expense strategy (e.g., a financial plan, budget, investment strategy, etc.) and/or loan (e.g., an offer for a loan) structured to meet the financial goal corresponding with the location of the consumer computing device 120. As used herein, the term "loan" may be used to refer to a car loan, auto loan, personal loan, mortgage, student loan, line of credit, etc. The expense strategy and/or loan may be based on one or more parameters such as, but not limited to, the user account information, user financial information, current budget, and spending patterns. The expense strategy and/or loan may be displayed or otherwise communicated to the user via an application 250 running on consumer computing device 120. The application may receive an indication of acceptance of the expense strategy and/or the loan when the customer clicks a link, button, icon, image, etc. via the consumer computing device 120. Alternatively or additionally, the consumer computing device 120 may receive an indication of acceptance in response to receiving a voice input (e.g., the user says a voice trigger or voice key, such as, but not limited to, "accept loan," "I accept the offer for the loan," "I accept the expense strategy," etc.).

Before pervasive advising is provided and/or an expense strategy generated, a customer may be authenticated to the provider computing device 110 and/or consumer computing device 120. The customer may be an account holder already, or may open accounts or otherwise provide access to various accounts that may be administered by the provider or by other financial institutions. The customer may be authenticated based on the authentication credentials of the customer. In some arrangements, the customer may be identified and authenticated based on an application 250 that was made available via the provider computing device 110 (e.g., by being transmitted to an application store) for download by the consumer computing device 120 such that additional identification information or account information from the customer is not required. The user authentication data may include any of a password, a PIN (personal identification number), a user ID, an answer to a verification question, a biometric, an identification of a security image, or a combination thereof. The authentication circuitry 230 and/or application 250 may compare the received authentication data with known and verified user authentication data. If the authentication data provided does not match the known and verified user authentication data, the customer is not authenticated. In some implementations, consumer computing device 120 receives a voice input (e.g., a voice trigger, voice key, etc.) indicative of a financial goal while actively listening to conversations. For example, a user (e.g., a customer, potential customer, other person, etc.) may be contemplating buying a new car. The customer may make such statements as "I want to purchase a new car," "I want to save for a home," etc.

In some implementations, provider computing device 110 and/or consumer computing device 120 may provide advice or otherwise make suggestions to the customer and/or engage in conversation, discussion, or dialogue with the user to learn more about the financial goal and to generate an expense strategy that may be of interest to the user. In some examples, the consumer computing device 120 may be structured to ask the customer questions or otherwise request feedback from the user, such as, "how much do you want to pay for the new car?", "how much do you want the monthly loan payment to be?", etc. The consumer computing device 120 may be structured to detect the voices of multiple persons and distinguish the voice input associated with the customer from the voice input or sound associated with another person or user. Alternatively or additionally, the provider computing device 110 may learn that the customer is contemplating a financial goal (e.g., purchasing a new car) from a financial professional (e.g., a banker) who may be assisting the user with financial planning (via, e.g., advisor computing device 130 or through other suitable channels).

In some implementations, there may be a time period between the receipt of the voice input and the generation of an expense strategy such that transaction data, the voice input, etc. may be stored for later use and/or retrieval. For example, the customer may have expressed an interest in the financial goal (e.g., the purchase of a new car, home, property, etc.) minutes, hours, days, or months ago such that the voice input, transaction data, etc. may be stored in memory or any other suitable storage. Later, the voice input, transaction data, etc., may be retrieved or otherwise accessed for generation of an expense strategy and/or loan offer as described herein. For example, the customer may have expressed an interest in purchasing a new car several months ago when the desire was not urgent or otherwise was not a priority. When the consumer computing device 120 listens to the conversation of the user and detects that the customer is now expecting to have a baby, the voice input, transaction data, etc., may be retrieved or otherwise accessed from storage.

As described herein, the loan underwriting may be generated or otherwise triggered based on the location (e.g., the geolocation) of the user. In examples wherein the user is not ready to accept the expense strategy and/or the loan, there may not be an impact on the credit score of the user. There may not be an impact on the credit score of the user where, for example, the underwriting of the loan occurred based on user financial information maintained using one or more provider computing devices 110 (e.g., the internal financial institution data). For example, though the user is at a car dealership looking at cars, the user may not be ready to purchase a new car. Because the provider computing device 110 may have generated the loan or otherwise pre-qualified the user for the loan based on the internal financial institution credit score and/or financial patterns with financial institution, there is not an impact on the credit score of the user. Advantageously, the user may receive an expense strategy and/or an offer for a loan without an impact to their credit score associated with an external credit bureau or other financial institution.

In some examples, the provider computing device 110 may be structured to adjust the approval amount of the loan based on one or more parameters such as, but not limited to, the customer account information, financial information, current budget, and spending patterns. The approval amount may be adjusted in real-time or near real-time. The financial information of the customer may be indicative of a change in the finances of the user. For example, the internal financial score of the user may have improved such that the underwriting engine 255 may generate a loan at a lower interest rate than the previous loan generated. In such examples, the approval amount for which the user has been approved may be adjusted (e.g., dynamically updated) in response to a transaction performed or executed by the user. For example, the analytics engine 275 may analyze the financial information of the user and/or the spending patterns of the user to generate transaction data. The transaction data may be provided to or retrieved by the underwriting engine 255 for use in determining loan amounts and/or interest rates.

In some implementations, if the customer took an action (e.g., paid the balance of a credit card off, made a payment on time, etc.) that had a favorable or unfavorable result on the financial information (e.g., the credit score) of the user, the user may receive an expense strategy notification that includes such feedback (e.g., favorable feedback) for having taken that action. For example, an expense strategy notification may include a message like or similar to, "with your new lower interest rate due to your improved credit score, you can now afford a car that costs 27,500!"

As used herein, the term "authentication circle" may refer to a group comprising two or more members who are connected or otherwise linked such that a first member of the authentication circle may gain access to an account of a second member of the authentication circle without providing authentication credentials of the second member of the authentication circle. For example, the first member may be authenticated to access the account of the second member by providing authentication credentials of the first member, instead of providing authentication credentials of the second member. An authentication circle may be formed among members who are family, friends, or otherwise related. Members of an authentication circle may share a goal (financial or otherwise), and one or more members may wish to monitor and/or manage the accounts (financial or otherwise) of one or more other members.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

The various components of the computing systems and user devices (such as modules, monitors, engines, trackers, locators, circuitry, interfaces, sensors, etc.) may be implemented using any combination of hardware and software structured to execute the functions described herein. In some embodiments, each respective component may include machine-readable media for configuring the hardware to execute the functions described herein. The component may be embodied at least in part as one or more circuitry components including, but not limited to, processing circuitry, network interfaces, peripheral devices, input devices, output devices, sensors, etc. In some embodiments, a component may take the form of one or more analog circuits, electronic circuits (e.g., integrated circuits (IC), discrete circuits, system on a chip (SOCs) circuits, etc.), telecommunication circuits, hybrid circuits, and any other type of circuit. In this regard, the component may include any type of element for accomplishing or facilitating achievement of the operations described herein. For example, a component as described herein may include one or more transistors, logic gates (e.g., NAND, AND, NOR, OR, XOR, NOT, XNOR, etc.), resistors, multiplexers, registers, capacitors, inductors, diodes, wiring, and so on).

The component may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given components or parts thereof may be disposed locally (e.g., as part of a local server, a local computing system, etc.) or remotely (e.g., as part of a remote server such as a cloud based server). To that end, a component as described herein may include elements that are distributed across one or more locations.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method comprising:
   capturing, by one or more processors, a first sound recording using a first sound sensor of a first device;
   identifying, by the one or more processors, a sound signature based on ambient sounds analyzed in the first sound recording captured by the first device of a user;
   determining, by the one or more processors, a physical location of the first device of the user based at least in part on the sound signature being indicative of the physical location;
   analyzing, by the one or more processors, the first sound recording to identify a biometric voice signature of the user and detecting a first phrase spoken by the user in the first sound recording;
   identifying, by the one or more processors, a good or service based at least in part on the first phrase spoken by the user in the first sound recording:
   determining that the physical location corresponds with a source of the identified good or service; and
   in response to determining that the physical location corresponds with the source of the identified good or service:
   (i) determining an interest rate and a loan amount for a loan based at least in part on the identified good or service, an account balance of the user, and an amount of debt of the user;
   (ii) generating an underwritten loan for the identified good or service using the interest rate and the loan amount; and
   (iii) visually presenting, in a dashboard of an application running on the first device, the underwritten loan to the user on a display screen of the first device as an option for paying for the identified good or service.

2. The method of claim 1, further comprising:
capturing, by the one or more processors, a second sound recording using a second sound sensor of a second device;
analyzing, by the one or more processors, the second sound recording to identify the biometric voice signature of the user and detecting a second phrase spoken by the user in the second sound recording; and
identifying, by the one or more processors, the good or service based at least in part on both the first and second phrases spoken by the user in the first and second sound recordings, respectively;
wherein the first device is a smartphone, and the second device is a smart speaker.

3. The method of claim 1, wherein determining the physical location is further based at least in part on a sensor reading of a location sensor of the first device.

4. The method of claim 1, wherein determining the physical location is further based at least in part on a transaction executed via a mobile application running on the first device.

5. The method of claim 1, wherein determining that the physical location corresponds with a source of goods or services comprises cross-referencing the physical location with merchant data in a database, wherein the database is a third-party database accessed via a telecommunications network.

6. The method of claim 1, further comprising determining the goods or services are goods or services desired or needed by the user, wherein the underwritten loan is not presented to the user unless the goods or services are determined to be goods or services desired or needed by the user.

7. The method of claim 1, further comprising determining the goods or services are goods or services desired or needed by the user, wherein the goods or services are determined to be goods or services desired or needed by the user based at least in part on a sound sample detected using a sound sensor of at least one of the first device or a second device, wherein the first device is a smartphone, and the second device is a smart speaker.

8. The method of claim 7, wherein determining the goods or services as goods or services desired or needed by the user further comprises analyzing the sound sample based at least in part on the biometric voice signature of the user.

9. The method of claim 7, wherein the sound sample is a first sound sample detected using the first device, wherein determining the goods or services as goods or services desired or needed by the user further comprises detecting a second sound sample using the second device, and wherein the goods or services are determined to be goods or services desired or needed by the user based at least in part on both the first and second sound samples.

10. The method of claim 9, wherein determining the goods or services as goods or services desired or needed by the user further comprises determining that a combination of the first and second phrases indicates that the goods or services are goods or services desired or needed by the user, and wherein the first and second sound samples are detected on different days.

11. The method of claim 1, further comprising determining the goods or services are goods or services desired or needed by the user, wherein determining the goods or services as goods or services desired or needed by the user comprises:
detecting a first sound sample and analyzing the first sound sample to identify a first fragmented issue indicator;
detecting a second sound sample and analyzing the second sound sample to identify a second fragmented issue indicator, wherein the second sound sample is non-overlapping in time with the first sound sample; and
determining that the first and second fragmented issue indicators together indicate that the user desires or needs the goods or services.

12. The method of claim 11, wherein the first fragmented issue indicator and the second fragmented issue indicator are phrases spoken by a first user and a second user, respectively.

13. The method of claim 12, wherein determining the goods or services as goods or services desired or needed by the user comprises:
identifying a f first biometric voice signature of the first user in the first sound sample;
identifying a second biometric voice signature of the second user in the second sound sample; and
determining that the first and second users are related, and that the first and second issue indicators are related.

14. A first device comprising:
a sound sensor configured to detect ambient sounds;
a location sensor configured to detect location data associated with the first device;
a network interface configured to communicate via a telecommunications network;
one or more user interfaces configured to present perceptible elements; and
a processor configured to:
capture a first sound recording using a first sound sensor the first device;
identifying a sound signature based at least in part on the ambient sounds detected using the sound sensor;
detect a physical location of the first device based at least in part on the sound signature being indicative of the physical location;
analyze the first sound recording to identify a bio metric voice signature of a user and detecting a first phrase spoken by the user in the first sound recording;
identify a good or service based at least in part on the first phrase spoken by the user in the first sound recording;
determine that the physical location corresponds with a source of the identified good or service; and in response to determining that the physical location corresponds with the source of the identified good or service:
(i) receive, from a service provider computing system, loan data for an underwritten loan for purchasing the goods or services, the underwritten loan comprising an interest rate and a loan amount generated by the service provider computing system based at least in part on the identified good or service, an account balance of the user, and an amount of debt of the user; and
(ii) visually present, in a dashboard of an application running on the first device, perceptible elements using the one or more user interfaces on a display screen of the first device to present the underwritten loan as an option for paying for the goods and services.

15. The first device of claim 14, wherein the processor is further configured to:

detect a sound sample using the sound sensor; and determine that the goods or services are goods or services desired or needed by the user based at least in part on the sound sample.

16. A service provider computing system comprising:

a network interface configured to communicate via a telecommunications network; and a processor configured to:
- determine a physical location of a first device based at least in part on a detected activity comprising at least one of:
  - detection of the physical location of the first device based at least in part on a sound signature generated using ambient sounds captured by a sound sensor of the first device; or
  - detection of a transaction executed via an application running on the first device and identification of the physical location of at least one entity engaging in the transaction; and
- identify a good or service by:
  - capturing a first sound recording using a first sound sensor of the first device;
  - analyzing the f first sound recording to identify a biometric voice signature of a user and detecting a first phrase spoken by the user in the first sound recording; and
  - identifying the good or service based at least in part on the first phrase spoken by the user in the first sound recording;
- determine, responsive to determining that the physical location of the first device corresponds to a source of the identified good or service, an interest rate and a loan amount fora loan based at least in part on the identified good or service, an account balance of the user, and an amount of debt of the user;
- generate an underwritten loan for the identified good or service using the interest rate and the loan amount; and
- transmit loan data corresponding to the underwritten loan to the first device for perceptible presentation via one or more user interfaces in a dashboard of the application of the first device to indicate on a display screen of the first device that the underwritten loan as an option for paying for the goods and services.

17. The service provider computing system of claim 16, wherein generating the underwritten loan comprises identifying goods or services that may be acquired at the physical location, and wherein the underwritten loan is generated for paying for the goods or services.

18. The service provider computing system of claim 17, wherein the processor is further configured to determine that the user associated with the first device desires or needs the goods or services.

19. The service provider computing system of claim 18, wherein the user is determined to desire or need the goods or services based at least in part on a voice input detected using the sound sensor of the first device.

* * * * *